United States Patent [19]
Klein et al.

[11] Patent Number: 5,157,740
[45] Date of Patent: Oct. 20, 1992

[54] METHOD FOR BACKGROUND SUPPRESSION IN AN IMAGE DATA PROCESSING SYSTEM

[75] Inventors: Robert Klein, Farmington; Karen A. Wilds, Plymouth; Michael Higgins-Luthman, Livonia; David C. Williams, Ann Arbor, all of Mich.

[73] Assignee: Unisys Corporation, Bluebell, Pa.

[21] Appl. No.: 653,403

[22] Filed: Feb. 7, 1991

[51] Int. Cl.$^5$ .................................................. G06K 9/38
[52] U.S. Cl. .................................... 382/51; 382/50; 358/462; 358/465; 358/466
[58] Field of Search .................. 382/50, 51; 358/464, 358/465, 466, 467, 462

[56] References Cited

U.S. PATENT DOCUMENTS

| | | | |
|---|---|---|---|
| 3,652,791 | 3/1972 | Shuey | 178/7.1 R |
| 3,668,637 | 6/1972 | Sakai | 340/140.3 AG |
| 3,805,239 | 4/1974 | Watanabe | 340/146.3 MA |
| 4,087,788 | 5/1978 | Johannesson | 340/146.3 AE |
| 4,091,424 | 5/1978 | Widergren | 358/260 |
| 4,363,036 | 12/1982 | Subramaniam | 358/261 |
| 4,399,467 | 8/1983 | Subramaniam | 358/261 |
| 4,410,965 | 10/1983 | Moore | 365/230 |
| 4,412,252 | 10/1983 | Moore et al. | 358/160 |
| 4,503,556 | 3/1985 | Scherl et al. | 358/462 |
| 4,510,618 | 4/1985 | Ataman et al. | 382/54 |
| 4,510,619 | 4/1985 | LeBrun et al. | 382/57 |
| 4,554,593 | 11/1985 | Fox et al. | 382/50 |
| 4,613,986 | 9/1986 | Ataman et al. | 382/54 |
| 4,672,186 | 6/1987 | Van Tyne | 235/470 |
| 4,675,909 | 6/1987 | Egami et al. | 382/50 |
| 4,710,822 | 12/1987 | Matsunawa | 382/51 |
| 4,734,784 | 3/1988 | Tanaka | 358/283 |
| 4,747,149 | 5/1988 | Umeda | 382/18 |
| 4,804,482 | 2/1989 | Nakajima | 250/327.2 |
| 5,055,944 | 10/1991 | Shibahara | 382/50 |
| 5,068,910 | 11/1991 | Ogura | 382/50 |

FOREIGN PATENT DOCUMENTS 0113410 7/1984 European Pat. Off.

OTHER PUBLICATIONS

Copyright: "Ordering Techniques For Coding of Two-Tone Facsimile Pictures", A. N. Netravali et al., The Bell System Technical Journal, 1976, pp. 1539–1552.

Copyright: "Some Extensions of the Ordering Techniques For Compression Of Two-Level Facsimile Pictures", F. W. Mounts et al., The Bell System Technical Journal, 1978, pp. 3057–3067.

Communication Article: "Twodimensional Facsimile Source Encoding Based on a Markov Model", Dieter Preuss, VDE/NTG, NTZ-Aufsätzo 1975 pp. 358–363.

Primary Examiner—Herbert Goldstein
Assistant Examiner—Steven P. Klocinski
Attorney, Agent, or Firm—Harness, Dickey & Pierce

[57] ABSTRACT

A digital image preprocessing method for eliminating background patterns and scenes from digitized gray level document image data. The method accepts multi-gray level image data as input and produces a gray level output image containing a "white" background. Document image backgrounds are eliminated (or suppressed) by computing a separate (and typically different) threshold value for each gray level pixel of the original document image. Input image pixels whose gray level is greater (brighter) than the threshold value are assumed to be background picture data and are modified to be "white" pixels in the output image. The pixel threshold value is determined dynamically pixel-to-pixel based on gray level pixel data observed within the input image. Additionally, the pixel threshold can be automatically controlled to insure retention of written and/or printed information present in the input image. Threshold control is accomplished by specifying a print contrast signal (PCS) parameter to the image preprocessing method. Documents which might use this preprocessing technique include, but are not limited to, bank checks, remittance documents, charge card slips, deposit slips and similar type financial documents.

6 Claims, 21 Drawing Sheets

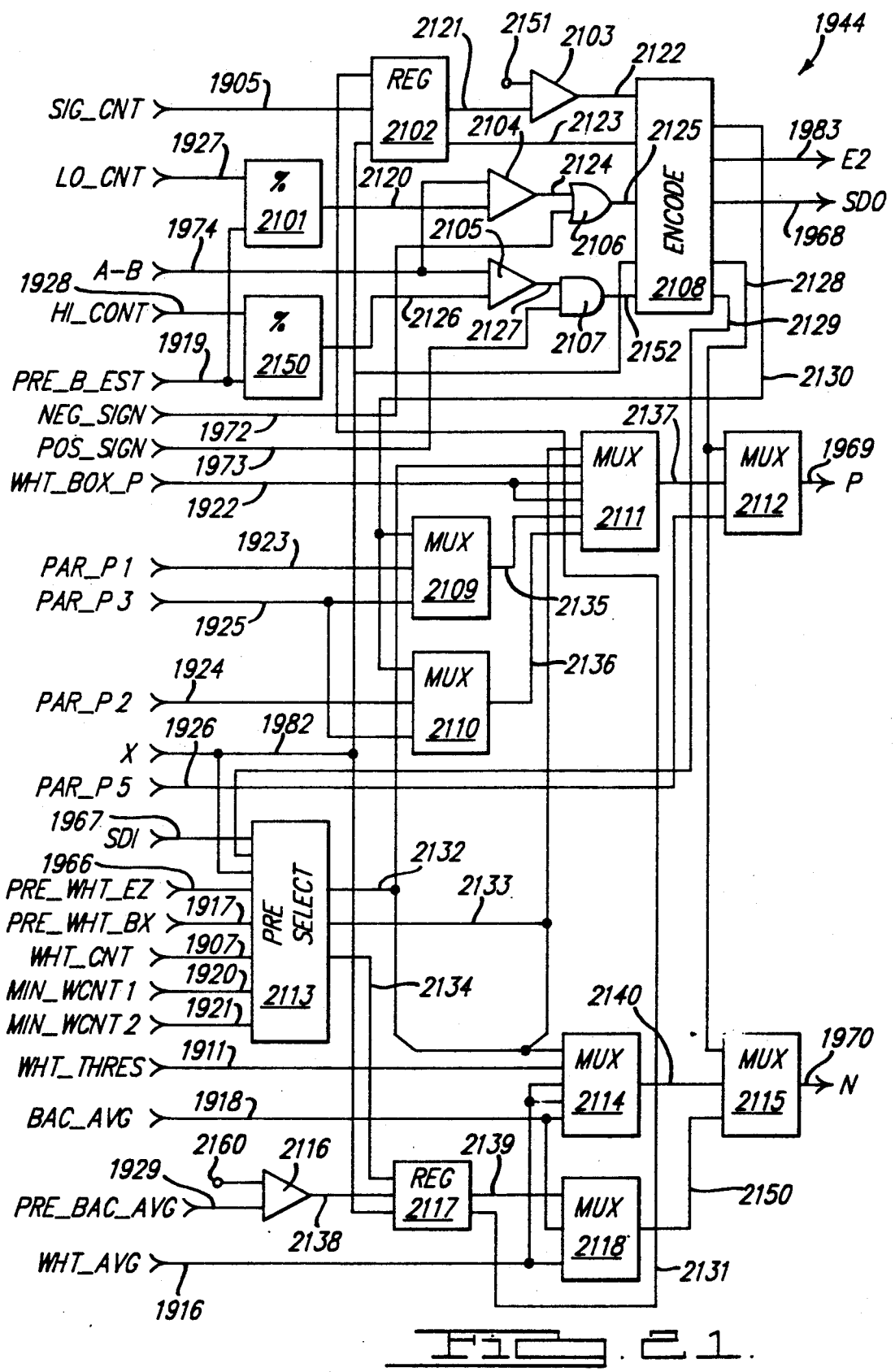

METHOD FOR BACKGROUND SUPPRESSION IN AN IMAGE DATA PROCESSING SYSTEM

BACKGROUND OF THE INVENTION

The invention relates to processing of video image data and, more particularly, to a method for the processing of video image data associated with a document imaging system. Still more specifically, the invention pertains to a method for distinguishing between useful data on the document and expendable background image data associated with that document and for discarding the expendable background data in order to effect more efficient storage and handling of the image data for the document.

Financial documents, such as checks, usually contain a plurality of characters printed in magnetic ink capable of being read by a sorter which automatically sorts such checks into a plurality of bins. Prior to sorting, these documents are physically handled by financial institution employees who enter the handwritten or typed dollar amount onto the check also with magnetic ink by the use of specialized amount entry equipment. Additionally, the employees physically enter any corrections associated with the reading of the magnetic ink code upon each of the sorted checks.

These prior techniques of utilizing employees to process financial documents have proven to be relatively labor intensive, inefficient and prone to human error. Many of the checks are lost, destroyed or mutilated during their physical handling. Additionally, the speed associated with the processing of the documents is limited to the processing capability of the employees and the particular mechanical amount entry equipment used by them.

The banking industry is now considering the adoption of electronic image data processing to eventually supplant the physical handling of documents such as checks by employees. As part of such image processing systems under consideration is a pre-processing technique on image data which deletes (or suppresses) non-useful background image data while retaining only useful information contained within such image data. Known techniques for background suppression for document images suffer from disadvantages of being incapable of retaining low contrast useful signal data which is located within the image in an all-white "box" region or removal of medium contrast textured document backgrounds.

SUMMARY OF THE INVENTION

Accordingly, a method is provided for the suppression of background data from gray level document image data which has been captured from a document as a plurality of digitized picture element (pixel) gray level values ranging from a darkest gray level value to a whitest gray level value. The method includes the steps of (a) selecting one of the plurality of pixels for examination: (b) defining a neighborhood of pixels having a preselected spatial relationship to the selected pixel; (c) determining a gray level signal threshold and a gray level white threshold as functions of a gray level background estimate of at least a pre-selected pixel in the neighborhood; (d) counting neighborhood pixels having gray levels equal to the white threshold and between the white threshold and the whitest gray level, counting neighborhood pixels having gray levels equal to the signal threshold and between the signal threshold and the darkest gray level, and counting neighborhood pixels having gray levels between the white threshold and the signal threshold; (e) determining a neighborhood classification as one of all white, all signal, all background and mixed, or partial, as a function of counts determined in step (d); (f) determining a suppression threshold gray level for the selected pixel in accordance with the neighborhood classification; (g) determining a new gray level value for the selected pixel as a function of the pixel's current gray level value and the suppression threshold gray level value for the selected pixel; and (h) selecting another one of the plurality of pixels for examination and repeating steps (b) through (g) for every pixel in a document image.

BRIEF DESCRIPTION OF THE DRAWING

The objects and features of the invention will become apparent from a reading of the detailed description of a preferred embodiment taken in conjunction with the drawing, in which:

FIG. 21 is a functional block diagram of the element 1944 of FIG. 19 for determining a pixel threshold when a window has been characterized as partial;

DETAILED DESCRIPTION

1. Document System Overview

Figure 1:
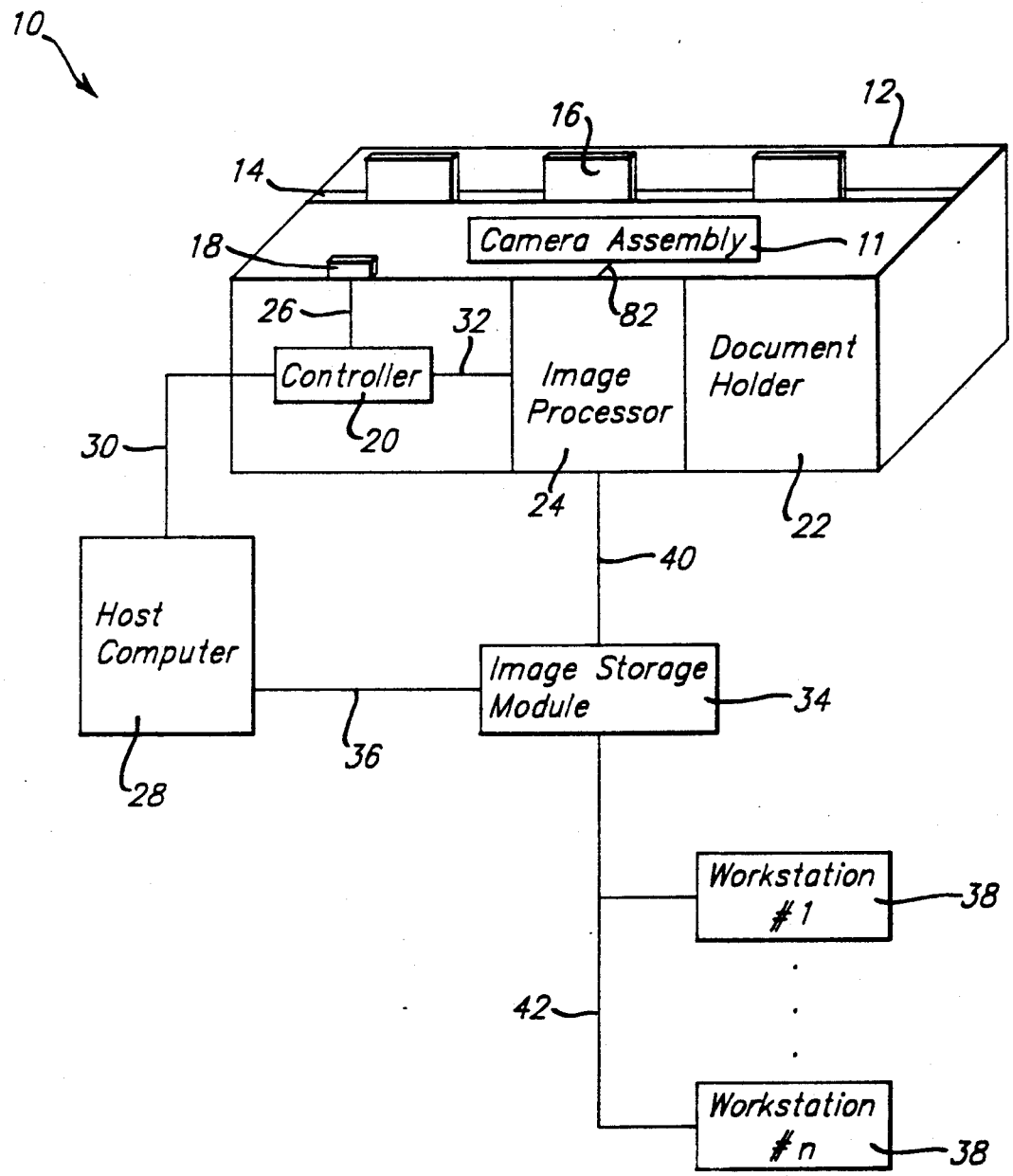
FIG. 1 is a block diagram of a typical financial document sorting system containing image processing apparatus arranged in accordance with the principles of the invention.

With reference to FIG. 1, there is shown a financial document sorting system 10 having a typical document sorter 12 which, in the preferred embodiment of this invention, is a model DP1800 sorter which is manufactured by Unisys Corporation of Blue Bell, Pa.

Sorter 12 includes a track 14 along which a plurality of financial documents 16 traverse. Sorter 12 further includes a known magnetic character reader 18 and a conventional magnetic character reader controller 20. Sorter 12 further includes a document holder 22, a camera assembly 11, and an image processor 24 arranged in accordance with the principles of the invention.

Controller 20 is coupled to reader 18 by bus 26, to a host computer 28 by bus 30 and to image processor 24 via bus 32. Computer 28 is coupled to an image storage module 34 via bus 36. Image storage module 34 is additionally coupled to image processor 24 and to a plurality of operator work stations 38 via buses 40 and 42, respectively. Additionally, camera system 11 is coupled to image processor 24 by bus 82.

In operation, documents 16 sequentially traverse past a reader 18 which reads a conventional magnetic code appearing upon each of the documents 16. This code is then transmitted to computer 28 via bus 30 for storage therein and to image processor 24 via bus 32. As each document 16 further travels along track 14, it passes in close proximity to camera system 11 which captures the image of document 16 and outputs a digital representation thereof on bus 82 to image processor 24. This digital representation comprises a plurality of image picture elements, or pixels, having an intensity represented by a number between 0 and 127. Image processor 24 then processes this digitized image and sends the processed image via bus 40 to image storage module 34 for storage therein. After passing by the image processor 24, each of documents 16 are then sorted, by sorter 10 in a conventional manner and are held within document holder 22 in a bin in accordance with the sorting information read from the documents.

After a typical block of documents 16 has been sorted in the aforementioned manner, the work stations 38, via signals on bus 42, sequentially request the document images from storage module 34. These images are then downloaded to the work stations 38 via bus 42, along with their associated magnetically coded data obtained from host computer 28.

After these images are captured by work stations 38, individual operators manually enter the dollar amount associated with each document and the operators utilize the work station to electronically resolve any difficulties associated with the reading of the magnetic code on the documents by entering and storing the needed corrections for each document image. Each digitized image and its dollar amount and associated corrections then form a single computerized record which is then sent to storage module 34 via bus 42 where it may be later accessed for use in automatically placing the dollar amount and corrections upon the documents themselves. Therefore, the document sorting system 10 of FIG. 1 substantially eliminates or minimizes the physical handling of documents 16, thereby increasing the efficiency and speed of the overall document sorting process.

2. Image Processor Overview

Figure 2:
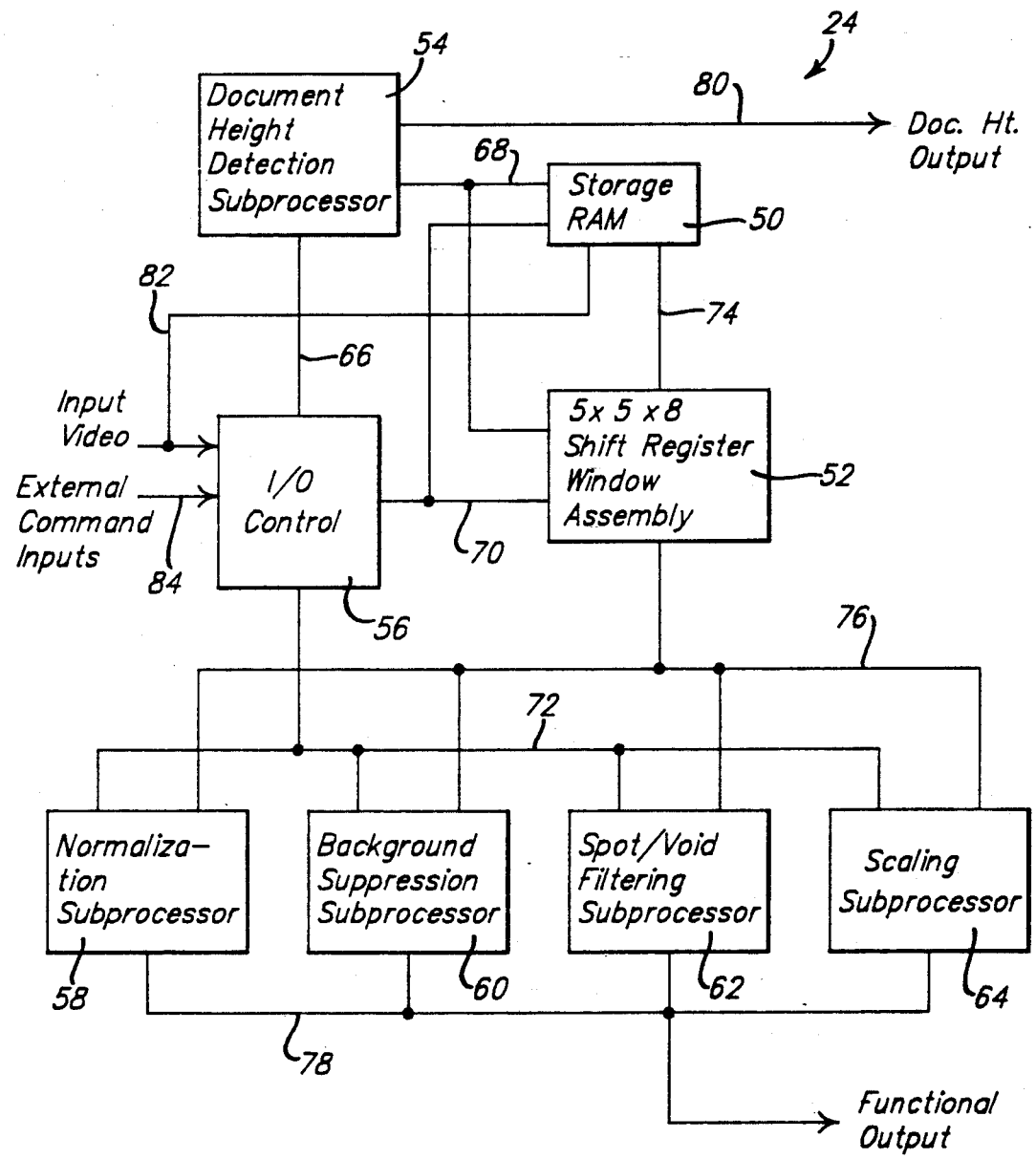
FIG. 2 is a block diagram of image processor 24 of FIG. 1.

Referring now to FIG. 2, there is shown further details of image processor 24 of FIG. 1, which includes random access storage memory (RAM) 50, 5×5×8 bit shift register window assembly 52, document height detection subprocessor 54, input/output controller 56, normalization subprocessor 58, background suppression subprocessor 60 (which is used to perform the method of the instant invention), spot/void subprocessor 62 and scaling subprocessor 64.

As seen from FIG. 2, document height detection subprocessor 54 is coupled to input/output controller 56 by bus 66 and is further coupled to RAM 50 and to shift register window assembly 52 by bus 68. Input/output controller 56 is coupled to RAM 50 and to shift register window assembly 52 by bus 70, while also being coupled to subprocessors 58, 60, 62 and 64 via bus 72.

Shift register window assembly 52 is additionally coupled to RAM 50 by bus 74 and is coupled to each of subprocessors 58, 60, 62 and 64 by bus 76. Additionally, subprocessors 58, 60, 62 and 64 are coupled together by bus 78 which represents a functional output associated therewith, while document height detection subprocessor 54 produces a document height output signal on bus 80.

Input video data is coupled to RAM 50 and to input/output controller 56 by bus 82, while input/output controller 56 further is coupled to input bus 84 which contains externally entered parameter data and command inputs which may emanate from host computer 28 via buses 30 and 32 (FIG. 1).

Generally, normalization subprocessor 58 is used to correct image data defects associated with such things as a non-uniform photocell responsiveness of camera assembly 11 (FIG. 1) or non-uniform document illumination across a segment of a document being scanned by camera assembly 11.

Background suppression subprocessor 60 is used to eliminate unwanted scenic or patterned background information from the image of a scanned document, while retaining printed and written information associated with the image represented by signals on bus 82. Background suppression subprocessor 60 provides for uniform background, increased image contrast and increased image uniformity associated with the video data placed upon bus 82. Spot/void filtering subprocessor 62 is used to eliminate small white and dark anomalies which adversely affect the quality and compressibility of the image generated by background suppression subprocessor 60, while scaling subprocessor 64 allows the image to be scaled relative to the resolution of the image by using one of a plurality of known algorithms. Document height detection subprocessor 54 finds the highest and lowest points of transition from the image of the document to the image of the document transport track to determine the overall height of the document whose image is represented by signals on bus 82.

Input/output controller 56 is used to receive externally placed commands and parameter data associated with the processing tasks of subprocessors 54, 58, 60, 62 and 64. Controller 56 is further used in the normalization function to allow a remotely located controller (e.g. host computer 28 of FIG. 1) to sample the input video signals appearing on bus 82. Input/output controller 56, by means of signals on bus 72, selects one of subprocessors 58, 60, 62 or 64 to be activated in response to external command inputs upon bus 84.

Shift register window assembly 52 is used as a repository for image pixel data and is used in the performance of various functions associated with subprocessors 58, 60, 62 or 64. In the preferred embodiment of this invention, shift register assembly 52 is dimensioned to have 5×5×7, or 175, bits, since each pixel associated with the video image appearing on bus 82 is 7 bits in length, and since the operations associated with the subprocessors 58, 60, 62 and 64 are performed upon a 5×5 pixel array or window.

Figure 3:
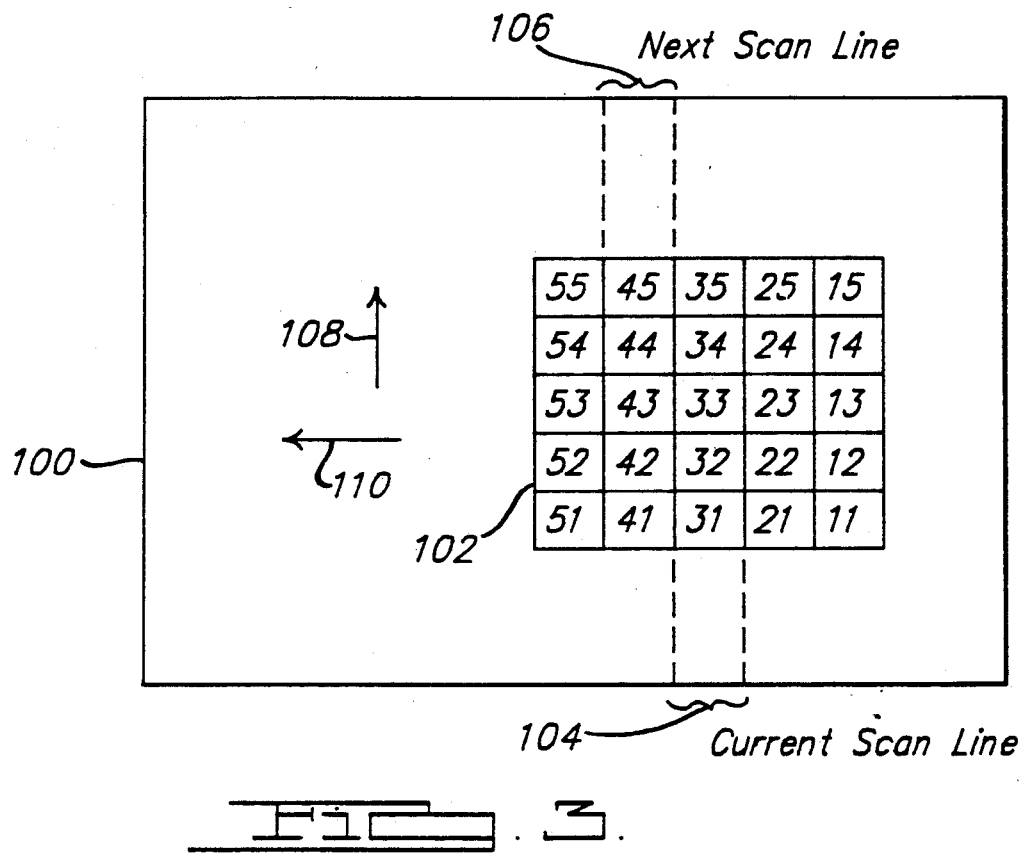
FIG. 3 is a diagram setting forth the manner in which a document whose image has been captured is scanned and how a neighborhood of pixels surrounding a pixel of interest is defined.
Figure 4:
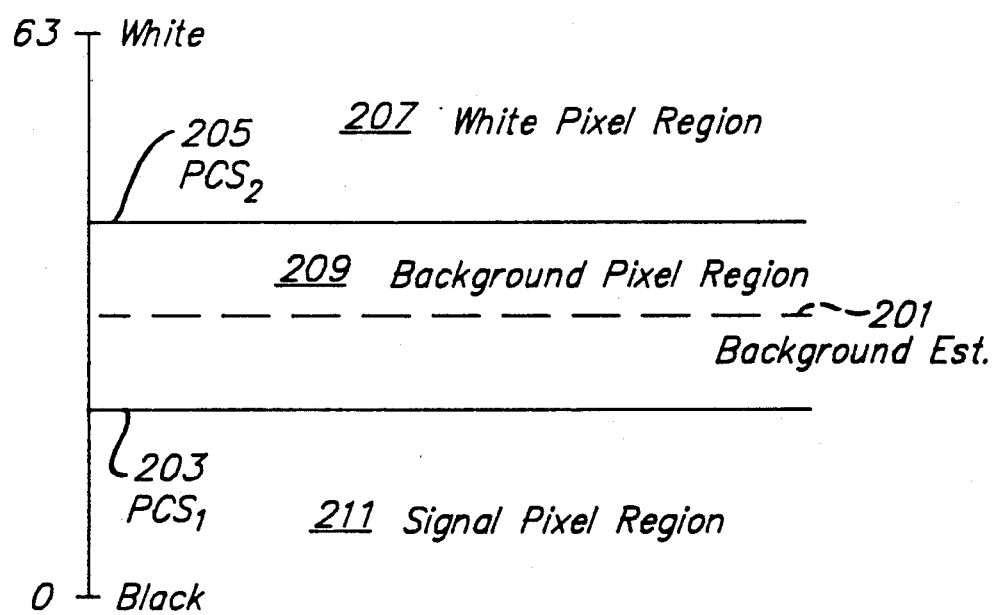
FIG. 4 is a diagram setting forth the relationships between white, background and signal pixel regions of a selected neighborhood of pixels.

Background Suppression Method Overview (FIGS. 3, 4)

As will be described in a later portion of this detailed description, background suppression subprocessor 60 of FIG. 2 is implemented in a CMOS integrated circuit hardware version to provide for the background suppression method of the instant invention. The method is implemented via hardware integrated circuit technology in the preferred embodiment for reasons of obtaining the requisite speed of the processing to be performed. It will be understood by those skilled in the art that a stored program processor approach to implementing the method could also be utilized in those situations where high speed document image processing is not required.

The background suppression method of the invention involves the processing of a given picture element (or pixel) of interest by examining a "window" or two-dimensional array of pixels having a predetermined spatial relationship to the pixel of interest. In the preferred embodiment, the pixel of interest forms the center pixel of a 5×5 array of pixel elements. This array or window is depicted in FIG. 3 with reference to a document image 100 within which the pixel window has been placed. With reference to FIG. 3, the pixel of interest is pixel 33, the center pixel in the 5×5 array of pixels which have been numbered from 11 through 55, as shown in FIG. 3.

Also as shown in FIG. 3, document image 100 is processed by a background suppression subprocessor such as subprocessor 60 of FIG. 2 by considering each pixel element in the image 100. Each pixel element is determined in a scanning sequence which scans pixels from the bottom of the document 100 to the top thereof in the direction shown by arrow 108. After a given scan line in the vertical direction as shown in FIG. 3 is completed, the next scan line is to the left — i.e. the scanning process takes place from top to bottom as shown by arrow 108 and then the subsequent scan lines are determined by going from right to left on the image 100 as shown by arrow 110 of FIG. 3. Hence, as seen from FIG. 3, window 102 defines the current pixel of interest as pixel element 33, which is in current scan line 104. After pixel 33 is processed, the next pixel of interest will then be pixel 34 as seen from FIG. 3. After the scan line 104 is completed, the next scan line 106 will be taken up for processing on a pixel by pixel basis with reference to that pixel's 5×5 array or window 102.

A major advantage of the method of the instant invention over prior approaches to background suppression of image data is the improved handling offered by the invention of low contrast signal data which may be embedded in either all white areas of background or in textured areas of background of the document. With reference to FIG. 4, there is shown three major areas along a spectrum of gray level values for picture elements of a document. In FIG. 4, for example, if the blackest gray level value is zero and the whitest gray level value is 63, then the three regions 207, 209 and 211 respectively designating white, background and signal pixel regions could be defined by using two "print contrast signals" PCS1 and PCS2 designated as 203 and 205, respectively, in FIG. 4. Any pixel having a value greater than the threshold associated with PCS2 would be designated a "white" pixel, while any pixel lying between PCS2 and PCS1 thresholds would be designated as a "background" pixel. Finally, any pixel having a value lower than the threshold associated with PCS1 would be designated as a "siqnal" pixel. It will be noted from FIG. 4 that the approximate mid-point of the background pixel region 209 is defined by a background estimate level 201. The key to a successful approach to background suppression is the proper choice and manipulation under the circumstances of background estimate level 201 and the definition of levels PCS1 (203) and PCS2 (205).

Hence, the method of the instant invention utilizes the concept of classifying every pixel in a predefined neighborhood about a pixel of interest, such as window 102 of FIG. 3, to be a signal, background or white pixel and then to average separately the background, white, and signal pixels to compute the various thresholds for determining whether a given pixel can be discarded as background and thus converted to a white pixel. In accordance with the broader aspects of the suppression method, each pixel 11 through 55 of window 102 of FIG. 3 is classified by comparing the gray level for each pixel with white and signal threshold values corresponding to PCS2 and PCS1 of FIG. 4, respectively. Next, all background pixels in the window are totaled along with a totaling of all signal pixels and white pixels in the window. Next, so called "local" parameters are calculated. These parameters are a signal average gray level, a background average gray level and a white average gray level. Next, the window is classified as either all white, all background (or "empty"), all signal (or "full"), or mixed (partial), depending upon the count of background, signal and white pixel window elements found in the previous step.

Next, the method determines the basis for calculating a threshold for the pixel of interest. If the window appears to have mostly background pixels, a local background average is used to determine the pixel threshold. If the window is mostly signal pixels, a different percentage of the background estimate is utilized to calculate the threshold. If the window contains mostly white pixel elements, then a local white average or a function thereof is utilized to calculate the threshold for the pixel of interest. Finally, if the window type is mixed or partial, further testing is performed and the threshold is calculated as a function of one of several alternative calculations.

The final step in determining the new gray level for the pixel of interest is implemented with a lookup table, which is entered by utilizing the current gray level value of the pixel of interest along with the calculated threshold. In one embodiment of the invention, a six bit pixel element is thus converted to a new four bit pixel element as a result of so entering the lookup table and reading the required result. If the pixel of interest is determined to comprise unnecessary background information, the result of the lookup table utilization will be to convert the pixel to an all-white value.

After the pixel of interest has been thresholded, a new global background estimate is calculated by taking the current global estimate and adding a function of the local background average of the window pixels of interest.

As will be seen from the following more detailed discussion of the background suppression method, the invention features background suppression processing for two special cases — namely, (1) "white box checking" wherein the various thresholds and calculations are appropriately biased when it is determined that a pixel of interest is within a white area of the document, and (2) a gradient processing feature for determining whether a pixel of interest is within a textured background region of the document, thereby requiring additional data manipulation in order to suppress such a background. The term "textured" background is used to refer, for example, to a background region containing a predetermined pattern, such as wavy lines which form no part of the useful signal information of the document image.

Figure 5:
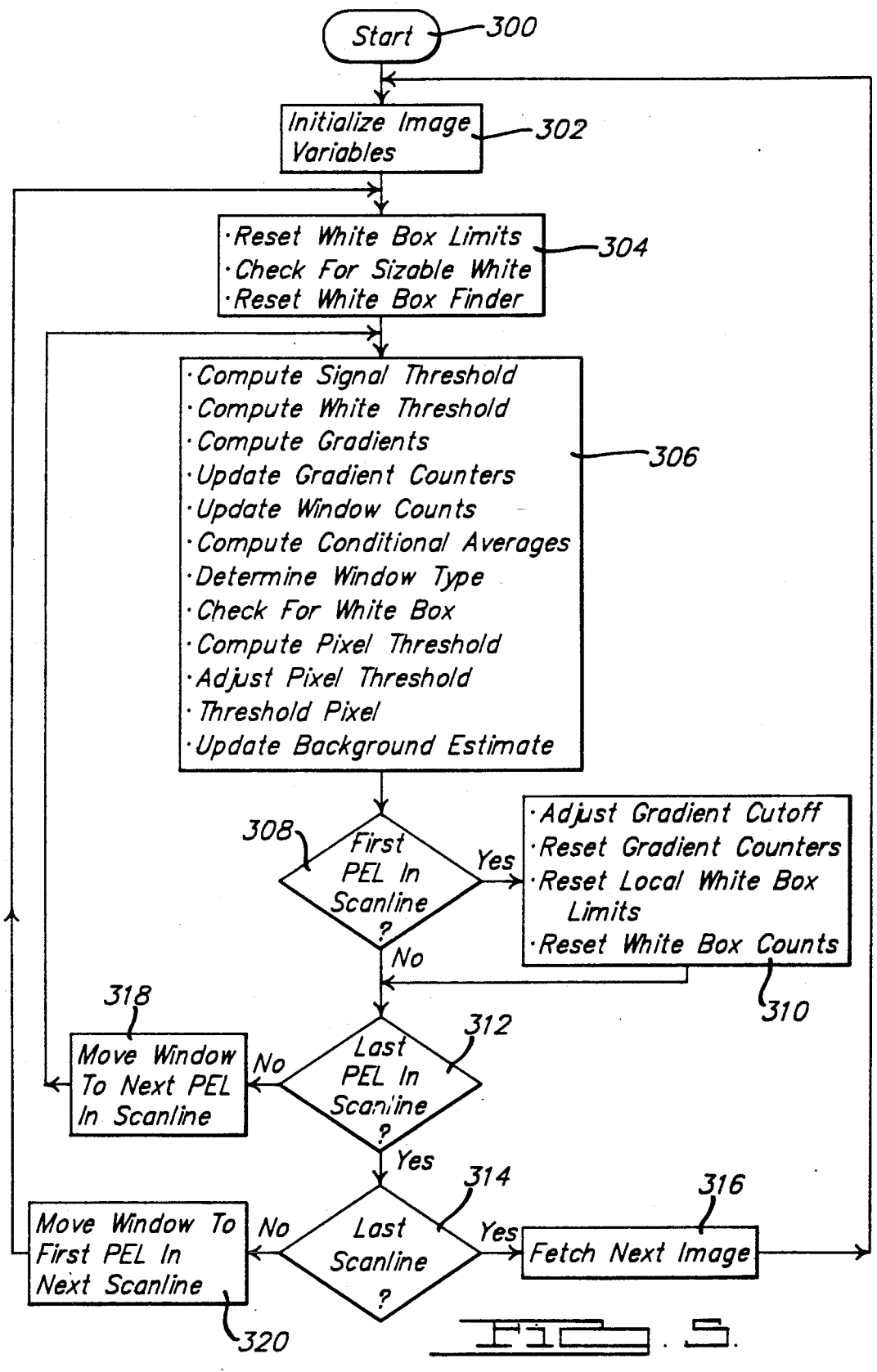
FIG. 5 is flow chart setting forth the various functions and the order in which they are performed in accordance with the principles of the invention.

Details of the Suppression Method (FIG. 5)

The details of the steps utilized in the method of the invention may be explained with reference to the flow chart of FIG. 5 along with Appendices 1 through 20, attached to this specification. Appendices 1 through 20 set forth in so-called "pseudo-code" the steps for implementing the various sub-routines set forth in the flow chart of FIG. 5. Those skilled in the art may readily implement an appropriate software program by utilizing the flow chart of FIG. 5 and the pseudo-code instructions set forth in the Appendices hereto. Additionally, it is believed that those skilled in the art of integrated circuit design could likewise implement the method of this invention in hardware apparatus using the information of the flow chart of FIG. 5 and Appendices 1-20. Nevertheless, an example of a hardware embodiment will be described with reference to FIGS. 6 through 25 in a later section of this description.

With reference to the flow chart of FIG. 5 and the various Appendices 1-20, when the background method is initiated at step 300 for a new document, various image variables in the method must be initialized at step 302 of FIG. 5. Image variable initialization for a preferred embodiment is set forth in the pseudo code, lines 101-109 of Appendix 1. For each scan line as defined in FIG. 3, a flag is reset indicating on which portion of the document image the current pixel processing is taking place. Additionally, for each pixel in the scan line a background estimate value is set to an initial background estimate value which may be chosen for a given system by the user thereof. As seen from lines 103 through 109 of Appendix 1, various other parameters are initialized for use in later sections of the pseudo code, as will become apparent to those skilled in the art.

After initialization of image variables, the method proceeds to step 304, wherein three different subroutines are utilized to reset white box limits, check for a sizable white area in the vicinity of the pixel being processed and reset a white box finder. The three subroutines of step 304 of FIG. 5 are further described in the pseudo code of Appendices 2, 3 and 4, respectively.

The first white pel and last white pel parameters of Appendix 2 are reset in accordance with empirically derived parameters which determine the minimum size of a "white box" or white area of the document image. Special processing of a pixel located within a white box may be required in order to retain low contrast signal information which may be present in such a white area.

Likewise in Appendix 3, a sizable white check is performed also using empirically derived parameters based on the number of white pixel elements found in a given scan line.

The white box finder of Appendix 4 uses a local storage array for keeping track of successive white picture elements in a given scan. VWHITE [i] will be set to 1 when a given pel being examined is determined to be white. This array or counter is used to test for the presence of a white box or area in the document image being processed by examining the length of a string of successive white pixels during a scan.

The next procedures undertaken in the method as flow-charted in FIG. 5 are those steps set forth at box 306. First, the signal and white thresholds are computed. The signal and white thresholds correspond to elements 203 (PCS1) and 205 (PCS2), respectively, shown in the diagram of FIG. 4. The pseudo code for computing the signal threshold is set forth at lines 501 through 507 of Appendix 5. The pseudo code for computing the white threshold is set forth at lines 601-603 of Appendix 6. As seen from Appendices 5 and 6, the signal and white threshold values are calculated as a function of a background estimate for a neighboring picture element to the picture element 33 of current interest.

Next, as shown in element 306 of the flow chart of FIG. 5, various pixel gradient and gradient counters are computed and updated. The gradient computation pseudo code is shown in Appendix 7, while the gradient counter update process is shown in the pseudo code of Appendix 8. When the background of a document image consists, for example, of wavy lines or other textured matter not necessary to be maintained as part of the useful signal in the image, the method of this invention uses a gradient approach to appropriately bias the PCS1 threshold level of FIG. 4 to thereby implement a more stringent test to find a signal element in such a background. As those of skill in the art will readily recognize from Appendix 7, the various gradients are manipulations of the relative gray scale values for picture elements in the immediate neighborhood of pel 33 of interest. These gradients give a measure of the amount of texture in the document background.

The next subroutine of step 306 to be undertaken is the updating of the various window counts utilizing steps 901-920 of the pseudo code presented in Appendix 9. As seen from the code of Appendix 9, for rows 1 to 4 of the 5×5 window (FIG. 3), the white sum, background sum, signal sum, white count, background count and signal count for row i is set equal to the value for the like parameter for row i+1. As seen in lines 907-912, the same parameters for row 5 are initialized to 0. Then, for pixel elements 15, 25, 35, 45 and 55 (see the window of FIG. 3) as seen in lines 913-920 of Appendix 9, either the white sum and white count or the signal sum and signal count or the background sum and background count are updated as a pair depending upon whether the gray level of the pixel of interest (i.e. pixel 33 of the window 102 of FIG. 3) falls in area 207, 209 or 211 of FIG. 4. In other words, the appropriate sum and count parameters are incremented if the gray level of the pel of interest falls within white background or signal pixel regions in accordance with the previously calculated white threshold (PCS2) or signal threshold (PCS1) of FIG. 4.

The next subroutine of step 306 of FIG. 5 is the computation of the conditional averages as set forth in pseudo code, lines 1001 through 1006 of Appendix 10. As seen from Appendix 10, for rows 1-5 of the window (FIG. 3), the number of white pixels, background pixels and signal pixels in the window are calculated in steps 1001 through 1003. Then, in steps 1004 through 1006 of Appendix 10, the average white gray level value, the average background gray level value and the average signal gray level value of the pixels in the window of interest are computed by summing the gray level values of each pixel in a row and dividing by the total count for a particular type of pixel, whether white, background or signal.

The next step in block 306 of the flow chart of FIG. 5 is the determination of the window type surrounding pixel 33 of FIG. 3. As seen in lines 1101 through 1107 of Appendix 11, the window type is basically determined by conditionally testing for the number of pixels of a certain type (signal, background or white) and comparing each such count to pre-selected threshold values. As a result of the testing process as set forth in Appendix 11, the window type is determined to be either signal, background, white, or partial (mixed). As will be seen from further appendices, this determination will in turn determine the appropriate calculation method to be used to compute a pixel threshold.

The next routine performed in step 306 of the flow chart of FIG. 5 is the checking for the presence of a white area of the document surrounding the pixel of interest. The pseudo code for checking for the presence of a white box is set forth in Appendix 12. As seen from the pseudo code of lines 1201 through 1221, the previously mentioned counter array VWHITE is utilized along with the window type, which has been previously determined, to test for the presence of a so-called "white box" or white area of a predetermined minimum size on a document's image.

Next, in step 306 of the flow chart of FIG. 5, a determination of the basis of the threshold for the pixel of interest is determined utilizing the various calculations and tests performed in the previous subroutines. Pixel threshold computation may be performed in accordance with the pseudo code set forth in lines 1301 through 1336 of Appendix 13. As seen from lines 1301 through 1306, if the window-type is full or mostly signal, then the pixel threshold is determined as a function of predetermined percentages of the background estimate for the pixel of interest — i.e. pixel 33 of FIG. 3.

As seen from pseudo code lines 1307 through 1312 of Appendix 13, if the window type is empty or mostly background and if it has been determined that the pixel of interest lies within a white box, then the pixel threshold is calculated as a predetermined percentage of either the previously calculated white threshold or the previously calculated average white gray level value for the window. If the pixel of interest is not within a white box and lies in an empty type window, then as seen from line 1312 of the pseudo code of Appendix 13, the pixel threshold is determined as a function of the background estimate for the pixel 33 of interest.

Pseudo code lines 1313 through 1334 set forth the various tests and calculations in determining the pixel threshold where the pixel 33 of interest is in a window which has been previously classified as partial or mixed The code steps in lines 1314 through 1321 are utilized when the window-type is partial and it has been determined there is no signal data present in the 5×5 window. Under these conditions, the document area being processed is a mixture of white data and background only. Hence, these two conditions are used to determine the pixel threshold as predetermined functions of either the white threshold, the average white value or the average background value previously calculated in prior steps.

Pseudo code lines 1322 through 1329 are utilized for the situation where the pixel 33 of interest lies within a low contrast region and therefore requires special biasing of the parameters utilized to compute the pixel threshold. Again, in this portion of the subroutine, the pixel threshold is, depending upon the circumstances, calculated as a function of either the white threshold, the average white value, or the average background value previously computed.

The pseudo code set forth in lines 1330 through 1331 is utilized to compute the pixel threshold for signals in the presence of smudges or other "noise" in the document image.

The pseudo code set forth in lines 1332 through 1334 is utilized to compute the pixel threshold if the window type is partial, and the previous special conditions were not met.

in code lines 1335 and 1336 of Appendix 13, if the window-type is white, then the pixel threshold is calculated as a predetermined function of the previously calculated average white value for the window surrounding the pixel of interest.

The next subroutine in step 306 of the flow chart of FIG. 5 adjusts the previously calculated pixel threshold value, if it is determined that the pixel of interest lies within a textured background having, for example, a wavy line pattern which would typically serve to obscure signal data on the document. The pseudo code for the conditional adjustment of the threshold value is set forth at lines 1401 through 1407 of Appendix 14. The key parameter utilized in adjusting the pixel threshold when one is in an area of textured background is the gradient cutoff value, which is an estimate of the mean value of the number of pixels within the window of FIG. 3 having a predetermined gradient value which has also been previously calculated in prior subroutines.

The next function to be performed at step 306 of the flow chart of FIG. 5 is the actual determination of a new gray level value for the pixel 33 of interest (FIG. 3). This step is represented in pseudo code form as line 1501 of Appendix 15. In a known embodiment of the invention, the pixel being processed has a six bit gray level value. After thresholding of the pixel in accordance with the invention, the new gray level will be a four bit value and is determined as a result of utilizing a lookup table. The address for entering the lookup table to obtain the new four bit value for the pixel of interest is derived by concatenating the gray level of the six bit pixel of interest with the pixel threshold calculated in the previous sub-routines. After this address is formed, then the table is entered accordingly and the new pixel gray level value is obtained.

The last subroutine to be performed at step 306 of the flow chart of FIG. 5 is the updating of the background estimate for use in processing the next picture element. The pseudo code implementation of the updating function is set forth at lines 1601 through 1611 of Appendix 16. The code of Appendix 16 not only updates the background estimate, but also tests for the location of the pixel of interest being in an edge region of the document. Basically, the new background estimate, if required, is a function of the old background estimate and of the local background average of all the picture elements of the 5×5 window (FIG. 3) surrounding the pixel of interest. Generally, this background update procedure only occurs when the 5×5 pixel window is classified as empty or mostly background. It will also be apparent to those skilled in the art from an examination of the pseudo code of Appendix 16 that the background estimate is also a function of the gray level value of the pixel 33 of interest when the pixel data is not too dark and not located on an edge of the document.

The next test to be performed in the flow chart of FIG. 5 is to determine whether the subroutines of step 306 have just operated on the first picture element in a scan line. This test is performed at step 308. If it is determined that the routine has just processed the first picture element in the scan line, then the subroutine functions of step 310 are performed. These subroutines are for adjusting the gradient cutoff, resetting the gradient counters, resetting local white box limits and resetting white box counts.

The pseudo code for adjusting the gradient cutoff is set forth at line 1701 through 1710 of Appendix 17. This timing adjustment is implemented in order to maintain a history of the nature of the background levels in a given scan line. The various gradient parameters utilized in this subroutine basically count the background edges in a scan line.

The gradient counters are reset to zero as seen from the pseudo code of Appendix 18. This resetting function, as mentioned earlier, occurs at the first pixel element in a scan line and is performed only once per scan line.

Also, at the beginning of each scan line as seen from the code of Appendix 19, the local white box test limits are reset to zero.

Likewise, at the beginning of each scan line, the white box counting parameters are also reset to zero, as shown in Appendix 20.

If step 308 determines that the first picture element in a scan line is not the one that has just been processed, then at step 312, the routine determines whether the last picture element in the scan line has just been processed. If the routine is not at the last picture element in the scan line, then at step 318, the window of FIG. 3 is moved to the next picture element in the scan line such that the element 33 of FIG. 3 now is concerned with a new picture element for further processing. The routine then returns to step 306 for the processing of the new pixel element 33 of interest.

If at step 312 it is determined that the last picture element in the scan line has been processed, then at step 314, the routine tests for whether this is the last scan line in the document. If it is not the last scan line, then at step 320 the window of FIG. 3 is moved such that it is centered upon the first pixel element in the next scan line of the document, and the routine returns to step 304 for further processing. If, at step 314, it is determined that the last scan line has been processed, then at step 316 the next document image is obtained and the routine returns to step 302 for image variable initialization.

Hardware Implementation of the Suppression Method (FIGS. 6–25)

As mentioned previously, the method of the invention as described above with reference to the flow chart of FIG. 5 and Appendices 1–20 could obviously be implemented as a software program for a general purpose computer. However, in applications such as document processing in the banking industry, the number of documents to be imaged and handled dictates that any successful document imaging system will exhibit very high speed. Under this condition, it has been found that the requisite speed is best obtained by implementing the various subroutines of the above described method in hardware form. FIGS. 6 through 25 set forth the details of a CMOS integrated circuit version of hardware structured in accordance with the disclosed method. While the various integrated circuit building blocks shown are custom designed, they do contain conventional logic elements well known to those skilled in the art. The arrangement of such logic elements will be apparent to the skilled artisan from an examination of the pseudo code calculation functions set forth in Appendices 1 through 20.

Figure 6:
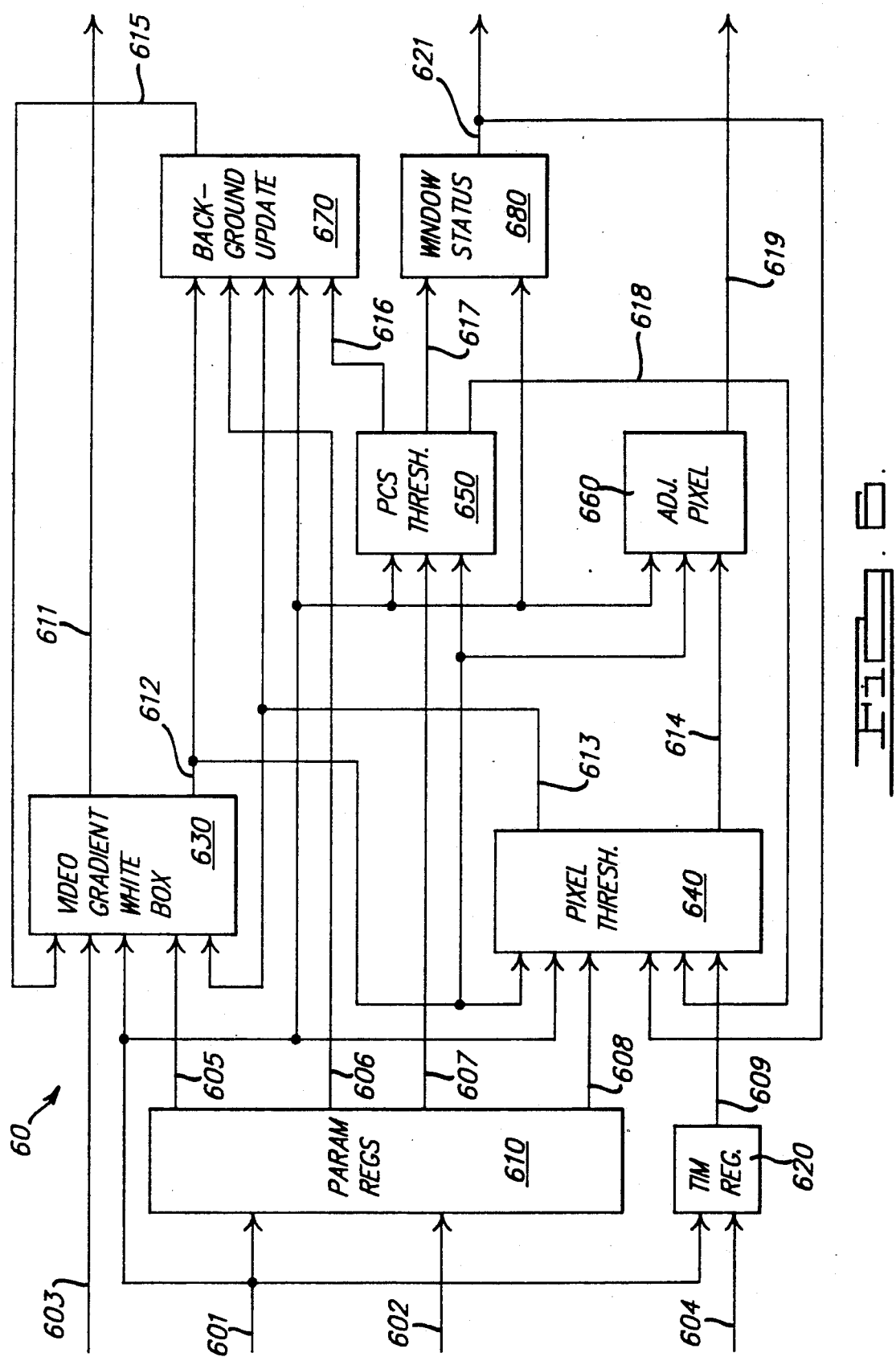
FIG. 6 is a block diagram of a hardware implementation of a method arranged in accordance with the principles of the invention.

FIG. 6 sets forth an overall block diagram of a CMOS integrated circuit implementation of a background suppression subprocessor 60 of FIG. 2 arranged in accordance with the principles of the invention. With reference to FIG. 6, background suppression subprocessor 60 is comprised of parameter registers 610, timing register 620, a video processing unit 630 which includes gradient processing functions and white box processing functions, a pixel threshold calculator 640, a PCS threshold calculator 650, a pixel threshold adjusting unit 660, a background estimate update unit 670, and a window status determining unit 680.

The various parameters used by the pseudo code in the method of the invention may be input to a hardware implementation of the method via bus 602 coupled to parameter register 610 of FIG. 6. Additionally, timing and control signals are present on a control bus 601 which is coupled to all the elements of FIG. 6.

Bus 603 coupled to processing element 630 includes the six bit gray level for the pixel being processed. Various parameters input to the system via bus 602 are stored in parameter register 610 whose outputs are coupled via bus 605 to processing element 630, via bus 606 to the background update processor element 670, via bus 607 to the PCS threshold calculator unit 650, and via bus 608 to the pixel threshold calculator unit 640.

Timing register 620 serves as a delay element for signal average, white average, and background average data presented to it via bus 604. The output of timing register 620 is coupled via bus 609 to the pixel threshold calculator unit 640.

The output of the video processing element 630 is included with signals on bus 611, while various other computational results from element 630 are coupled via bus 612 to the background estimate updater unit 670, the pixel threshold calculator unit 640, the PCS threshold calculator 650, and the pixel threshold adjuster unit 660.

Various portions of element 630 perform the functions set forth in the pseudo code of Appendices 2-4, 7-8, 12, and 17-20. Further details of element 630 will be described in a later section of this description in conjunction with FIGS. 8-17.

The pixel thresholding unit 640 performs the functions set forth in the pseudo code of Appendices 11 and 13, i.e. determining the window type and computing the pixel threshold, respectively. Further details of element 640 will be described in a later section of this description in conjunction with FIGS. 19-22. The pixel threshold calculated by unit 640 is placed on bus 614 for passage to the threshold adjuster unit 660. The window type information developed in unit 640 is coupled via bus 613 to unit 630 and the background estimate update unit 670.

The PCS threshold calculator unit 650 computes the signal threshold and the white threshold in accordance with the pseudo code set forth in Appendices 5 and 6, respectively. Outputs of the PCS threshold calculator 650 are coupled via bus 616 to the background estimate updater 670, via bus 617 to the window status unit 680 and via bus 618 to the pixel threshold calculator unit 640. Further details of element 650 will be described in a later section of this description in conjunction with FIG. 7.

The threshold adjustment unit 660 performs the functions defined by the pseudo code of Appendix 14. The output of the pixel threshold adjustment process performed in unit 660 is placed on bus 619 for use by a lookup table (not separately shown) previously described for use in determining the new threshold value for the pixel being processed. Further details of element 660 will be described in a later section of this description in conjunction with FIGS. 23 and 24.

The background estimate updater unit 670 performs the functions defined by the pseudo code of Appendix 16. The results of the background estimate update are placed on bus 615, which is coupled to unit 630. Further details of element 670 will be described in a later section of this description in conjunction with FIG. 25.

The window status determining unit 680 implements the functions defined by the pseudo code of Appendices 9 and 10 for updating window counts and computing conditional averages for the window surrounding the pixel of interest (see FIG. 3). The various window counts and conditional averages are output on bus 621. Further details of element 680 will be described in a later section of this description in conjunction with FIG. 18.

Figure 7:
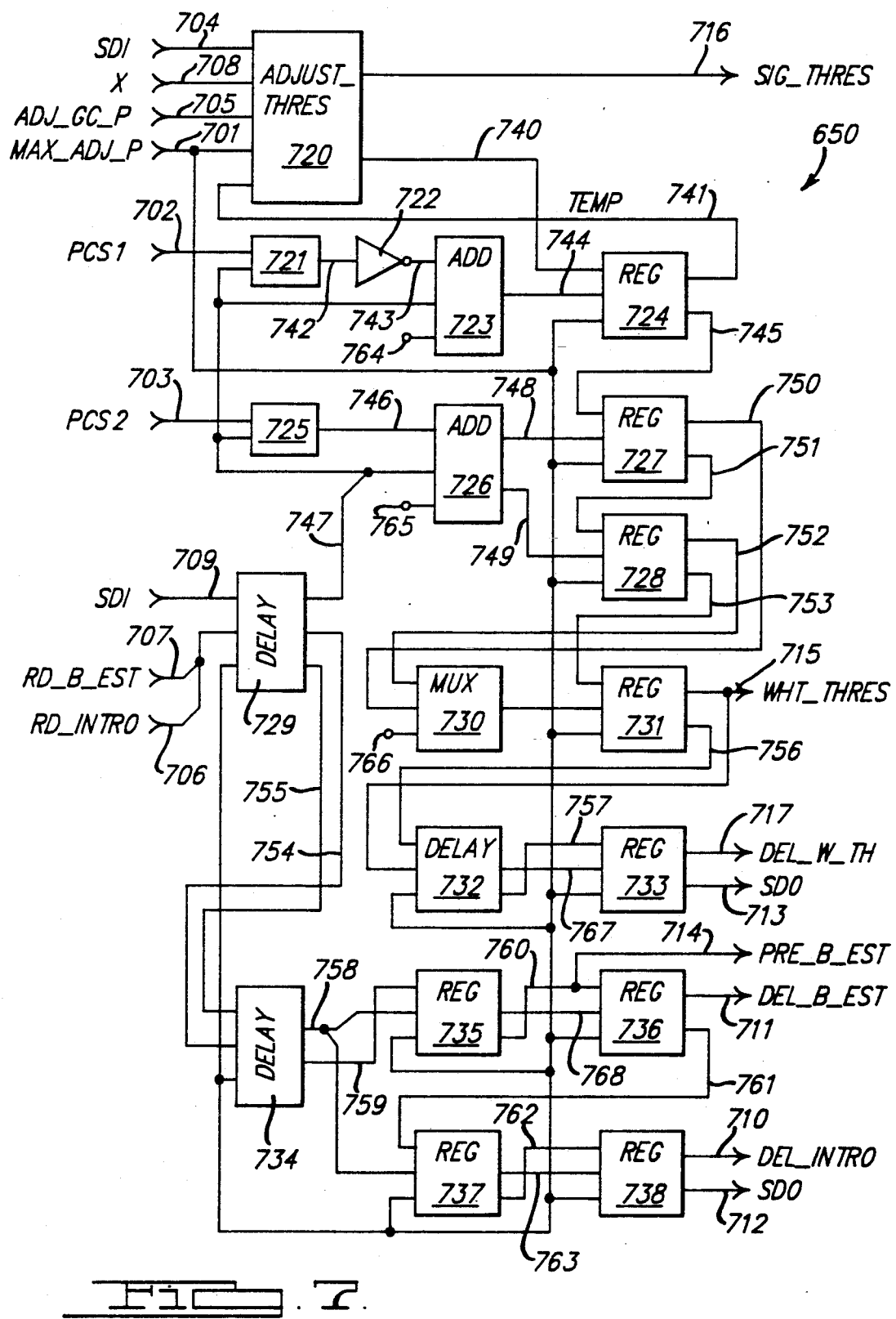
FIG. 7 is a functional block diagram of the print contrast signal and white thresholding element 650 of FIG. 6.

FIG. 7 depicts further details of element 650 of FIG. 6 which performs the compute signal threshold function (Appendix 5) and the compute white threshold function (Appendix 6). It will be recalled that the signal and white thresholds correspond respectively to levels PCS1 and PCS2 of FIG. 4. The elements of FIG. 7, which make up element 650 of FIG. 6, accept various parameters shown on input lines 701 through 709, multiply certain parameters by preselected percentages in units 721 and 725, add various parameters in adders 723, 726 and register the results in elements 724, 727 and 728. Other parameters are delayed by units 729 and 734 with the results of multiplexing, adding and further delaying input data held in registers 731, 733, 735, 736, 737 and 738. The principal outputs of the unit of FIG. 7 are the signal threshold value on bus 716 and the white threshold value on bus 715. Adjusting element 720 is comprised of conventional multipliers, exclusive or gates, multiplexors and registers arranged in the manner set forth in FIG. 24. Elements 721 and 725 are special purpose multipliers which produce at their outputs a percentage of one input determined by a signal on a second input.

FIGS. 8 through 12 set forth further details of that portion of the hardware system of FIG. 6 which performs the gradient processing functions — namely, reset gradient counters (Appendix 18), compute gradients (Appendix 7), update gradient counters (Appendix 8) and adjust gradient cut-off (Appendix 17).

Figure 8:
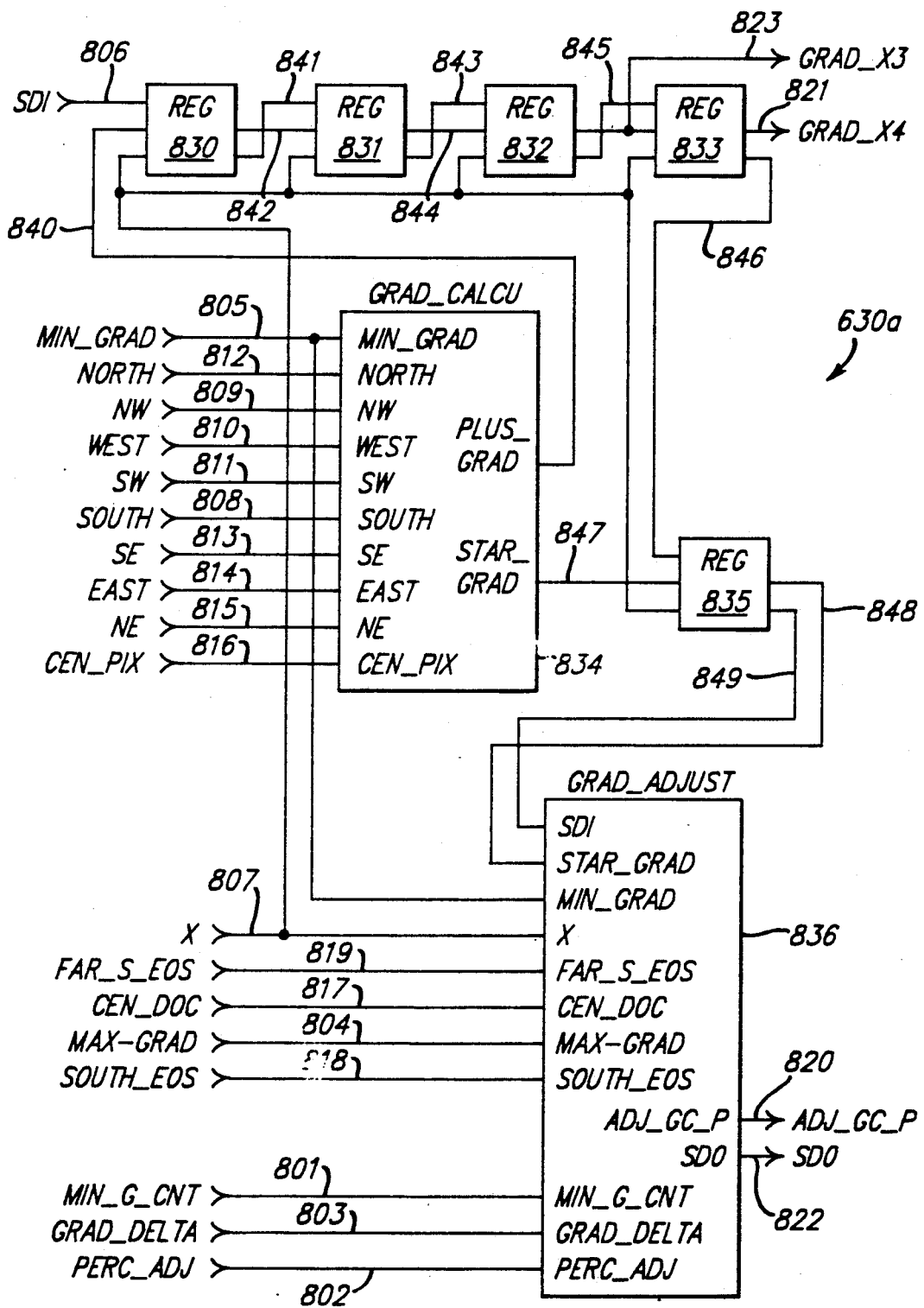
FIG. 8 is a functional block diagram of the gradient portion of element 630 of FIG. 6.

FIG. 8 sets forth a functional block diagram of a portion 630a of element 630 of FIG. 6 related to gradient calculation, gradient count update, and gradient cut-off adjustment functions. Gradient calculator unit 834 of FIG. 8 accepts various neighboring pixel data for those picture elements surrounding the pixel of interest. The gray level values of these neighboring pixels are then manipulated in accordance with the pseudo code of Appendix 7 to generate various gradient values at outputs 840 and 847 of element 834.

The gradient adjust unit 836 of FIG. 8 accepts various input parameters along with output information from unit 834 and performs the adjustment of the gradient count update and the gradient cut-off as set forth by the pseudo code of Appendices 8 and 17. As mentioned previously, the results of the gradient processing functions are used in thresholding a pixel which is located in an area of the document having a textured background.

Figure 9:
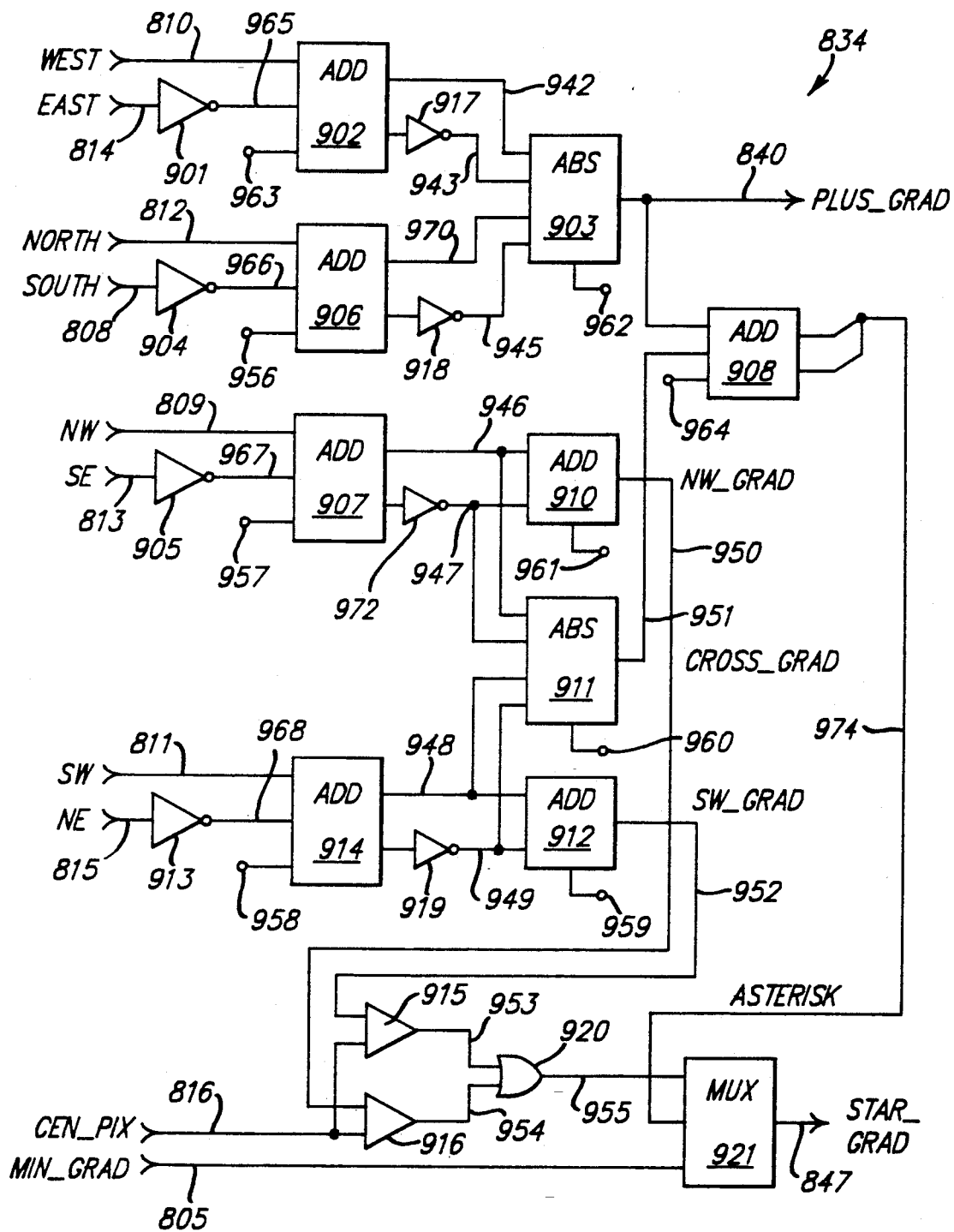
FIG. 9 is a functional schematic of the gradient calculation element 834 of FIG. 8 showing additional details thereof.

Further details of the gradient calculation unit 834 of FIG. 8 are set forth in FIG. 9. As seen from FIG. 9, gradient calculation unit 834 is essentially comprised of a series of adders (902, 906 through 908, 910, 912 and 914) and absolute value calculators (903 and 911) for implementing the equations shown in the pseudo code of Appendix 7. An absolute value unit, such as element 903, performs an arithmetic manipulation, such as subtraction, on numbers appearing at two inputs, such as 942 and 945, and places the absolute value of the result on an output, such as 840. The arithmetic function to be performed is determined by signals on inputs such as 943 and 946. The input parameters labeled East, West, North, South, NW, SE, SW, and NE, correspond to the pixels in window 102 of FIG. 3 which surround the pixel 33 of interest. Hence, it will be seen from the arrangement of elements of FIG. 3 that the West pixel of FIG. 9 would correspond to pixel 43, the East pixel of FIG. 9 to pixel 23, the North pixel of FIG. 9 to pixel 34, and the South pixel of FIG. 9 to pixel 32. Similarly, the Northwest pixel would be pixel 44, the Southeast pixel would be pixel 22, the Southwest pixel would be pixel 42 and the Northeast pixel would be pixel 24. It will be apparent to those of ordinary skill in the ar how the various invertors, such as 901, 904, 905 and adders such as 902, 906 and 907, are interconnected to perform the calculations involving the various window pixels called for in the pseudo code of Appendix 7.

Figure 10:
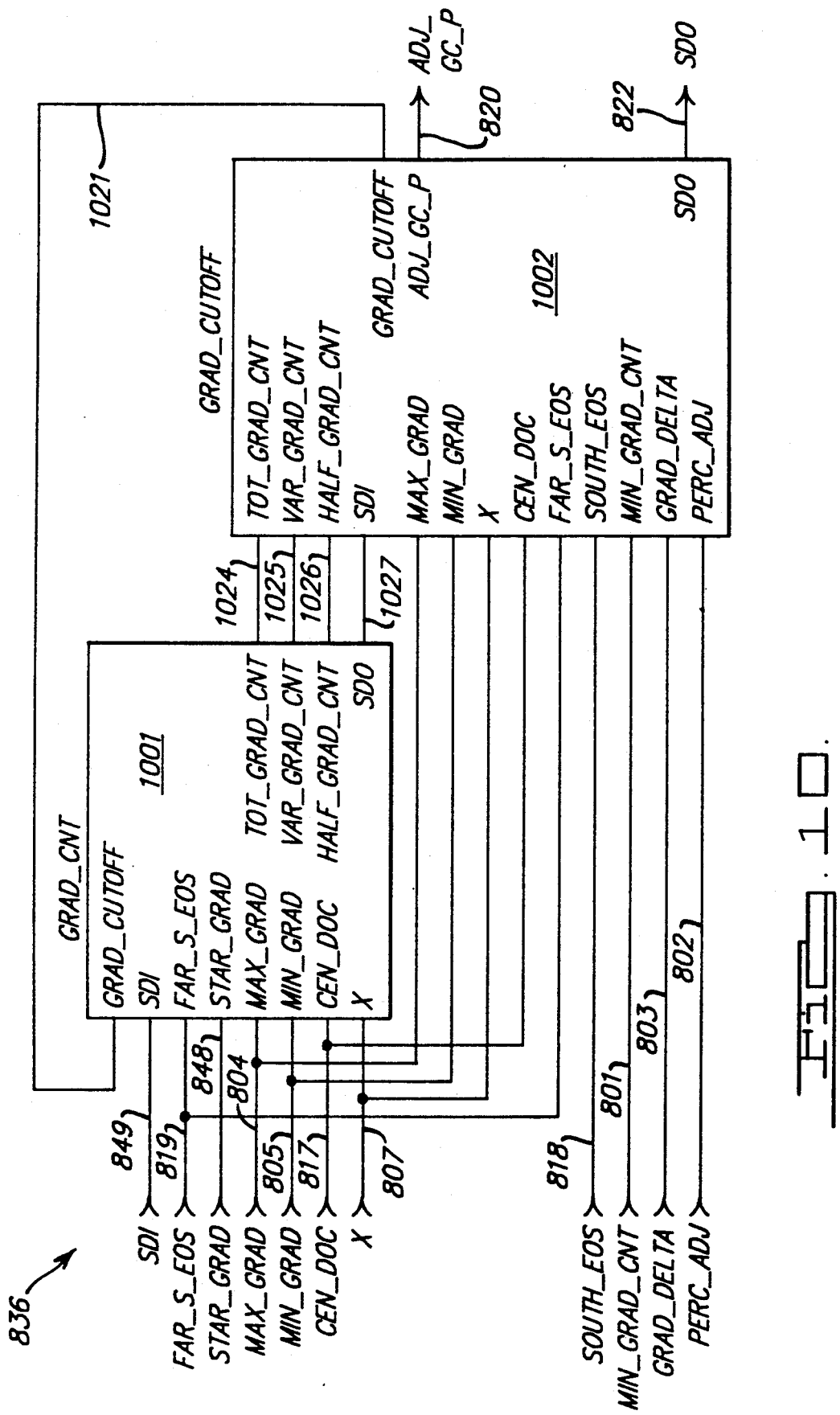
FIG. 10 is a functional block diagram of the gradient adjust element 836 of FIG. 8 setting forth further details thereof.

FIG. 10 sets forth further details of the gradient adjust element 836 of FIG. 8. As seen from FIG. 10, element 836 is comprised of two further functional modules: gradient counter element 1001 computes the various gradient counting functions required by the method of the invention, while gradient cut-off unit 1002 calculates any required adjustment to the gradient cut-off value. Essentially, gradient counter unit 1001 implements the pseudo code set forth in Appendix 8 for updating the gradient counters, while element 1002 of FIG. 10 implements the gradient cut-off adjustment functions set forth in the pseudo code of Appendix 17.

Figure 11:
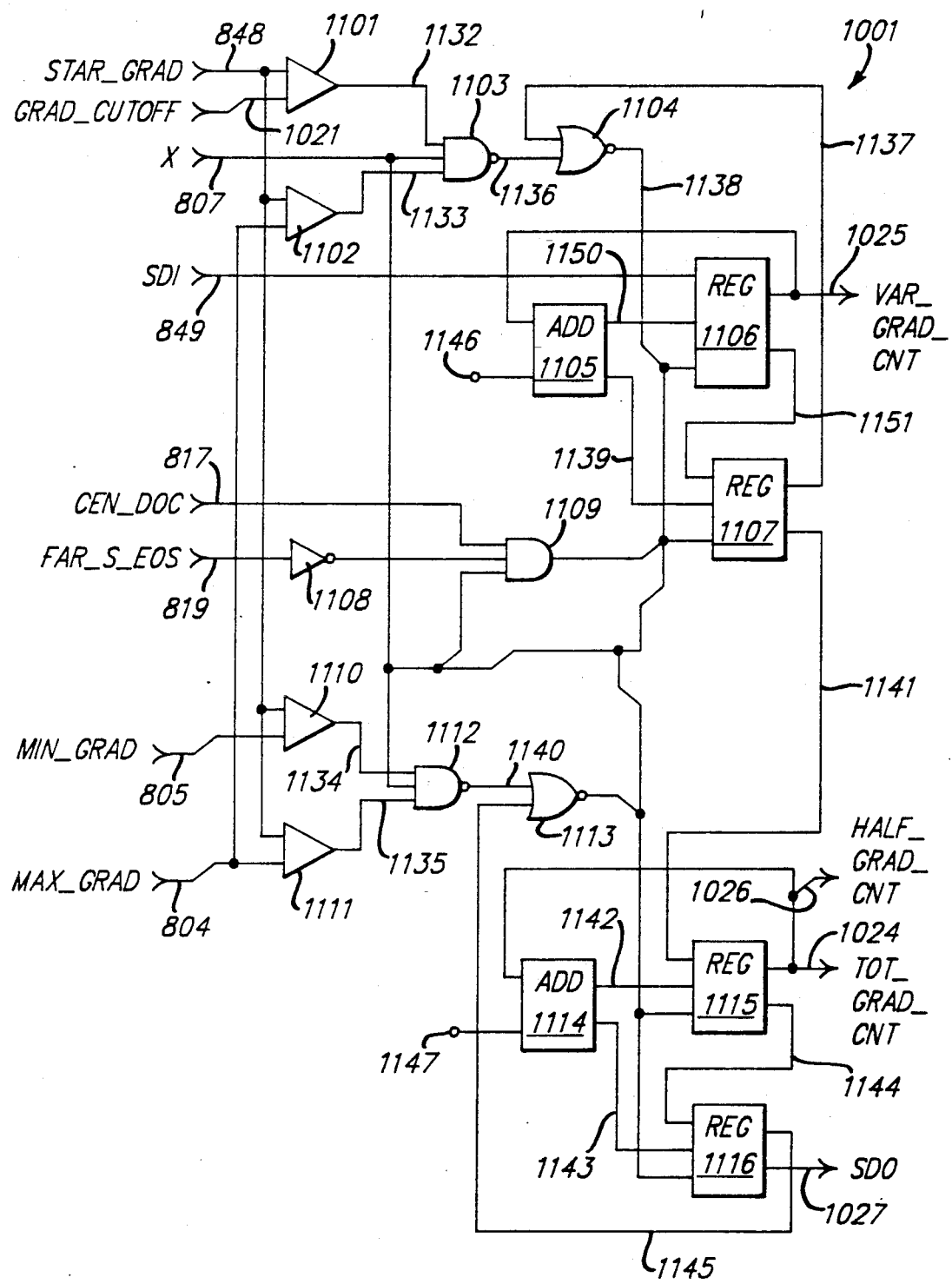
FIG. 11 is a functional schematic of the gradient count element 1001 of FIG. 10 setting forth further detail thereof.

FIG. 11 sets forth still further details of the gradient counter element 1001 of FIG. 10 and is seen to comprise a series of NAND gates, NOR gates, adders and registers arranged as shown for implementing the gradient counter update functions set forth in the pseudo code of Appendix 8.

Figure 12:
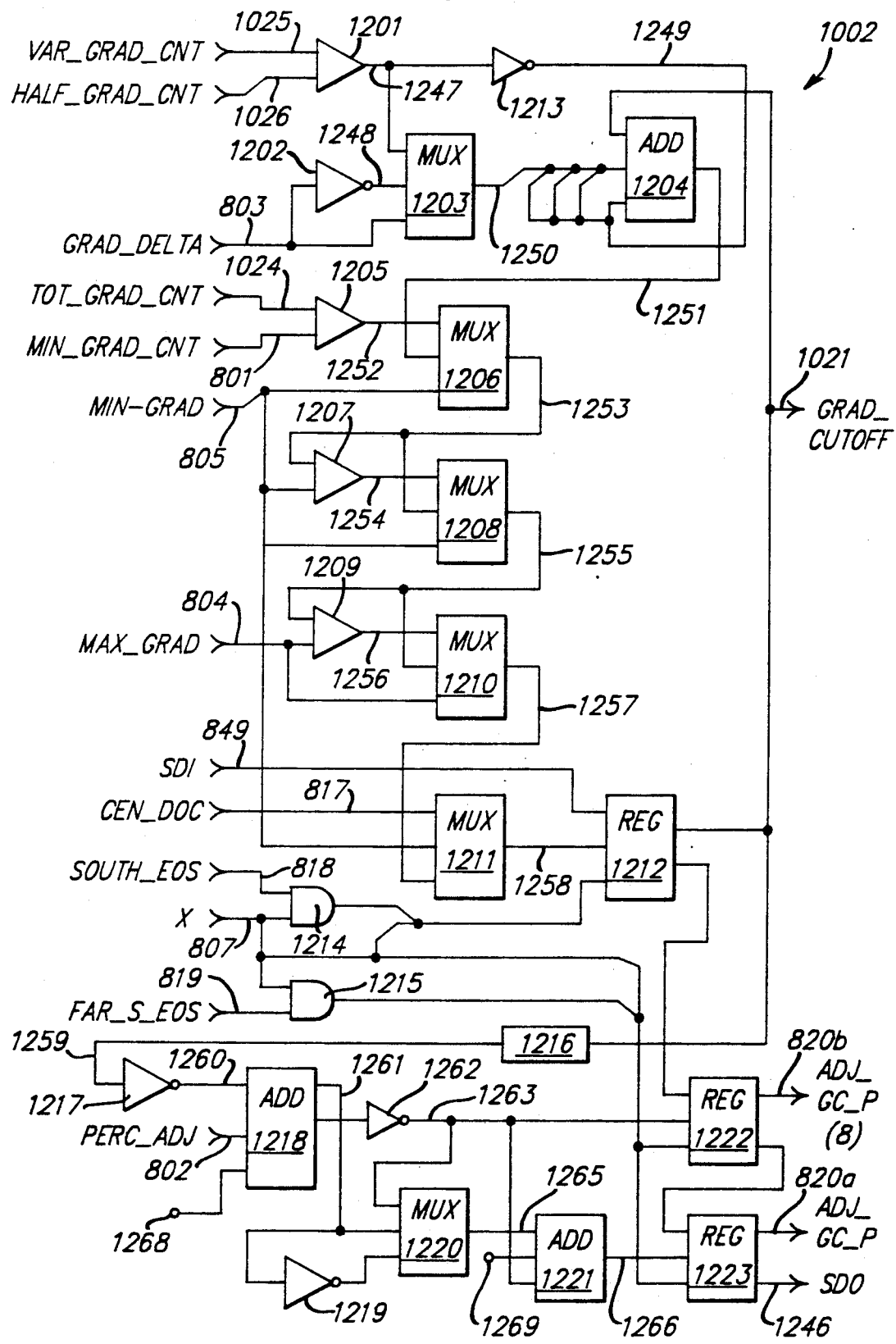
FIG. 12 is a functional schematic of the gradient cut-off element 1002 of FIG. 10 setting forth further details thereof.

FIG. 12 sets forth still further details of the gradient cut-off element 1002 of FIG. 10 and likewise is seen principally to comprise conventional logic elements interconnected in a manner such that the gradient cutoff adjustment function of the pseudo code of Appendix 17 is implemented therein. Element 1216 is a special purpose multiplier for converting from one base to another from input to output — e g. for converting a hexadecimal number at an input to a decimal number at an output.

FIGS. 13-17 depict further details of that portion of the hardware system of FIG. 6 which performs the white box processing functions — namely, check for white box (Appendix 12), reset white box limits (Appendix 2), check for sizable white (Appendix 3), reset white box finder (Appendix 4), reset local white box limits (Appendix 19), and reset white box counts (Appendix 20).

Figure 13:
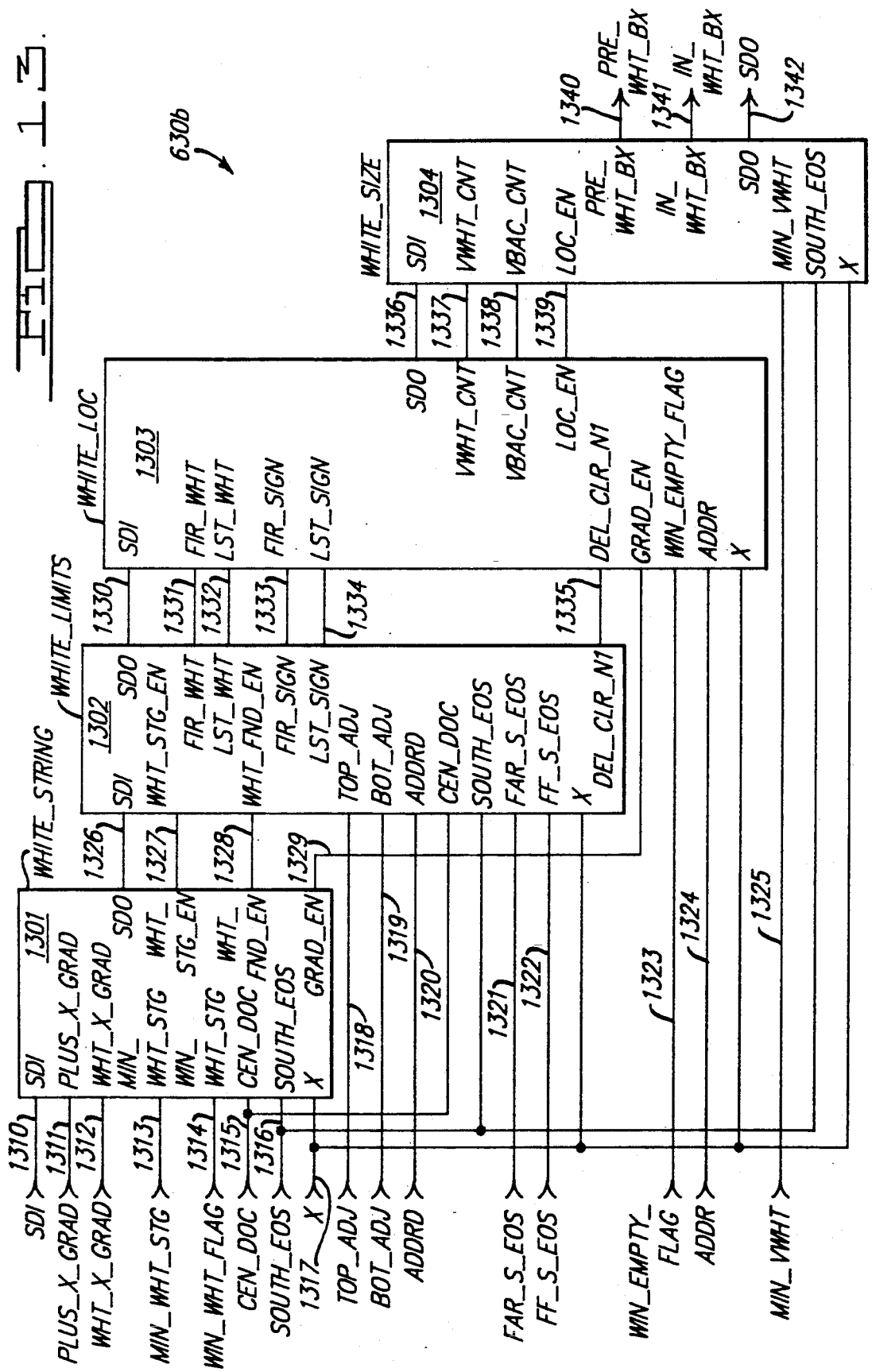
FIG. 13 is a functional block diagram of the white box processing portion of element of 630 of FIG. 6 setting forth further details thereof.

FIG. 13 sets forth a functional block diagram of portion 630b of element 630 of FIG. 6 related to white box processing. White string calculator 1301, white limits unit 1302, white locator unit 1303, and white size unit 1304 accept various parametric inputs via buses 1310 through 1325, and by cooperating among each other, ultimately present an indication at output bus 341 whether or not the pixel of interest is in a white box area of the document being processed.

Figure 14:
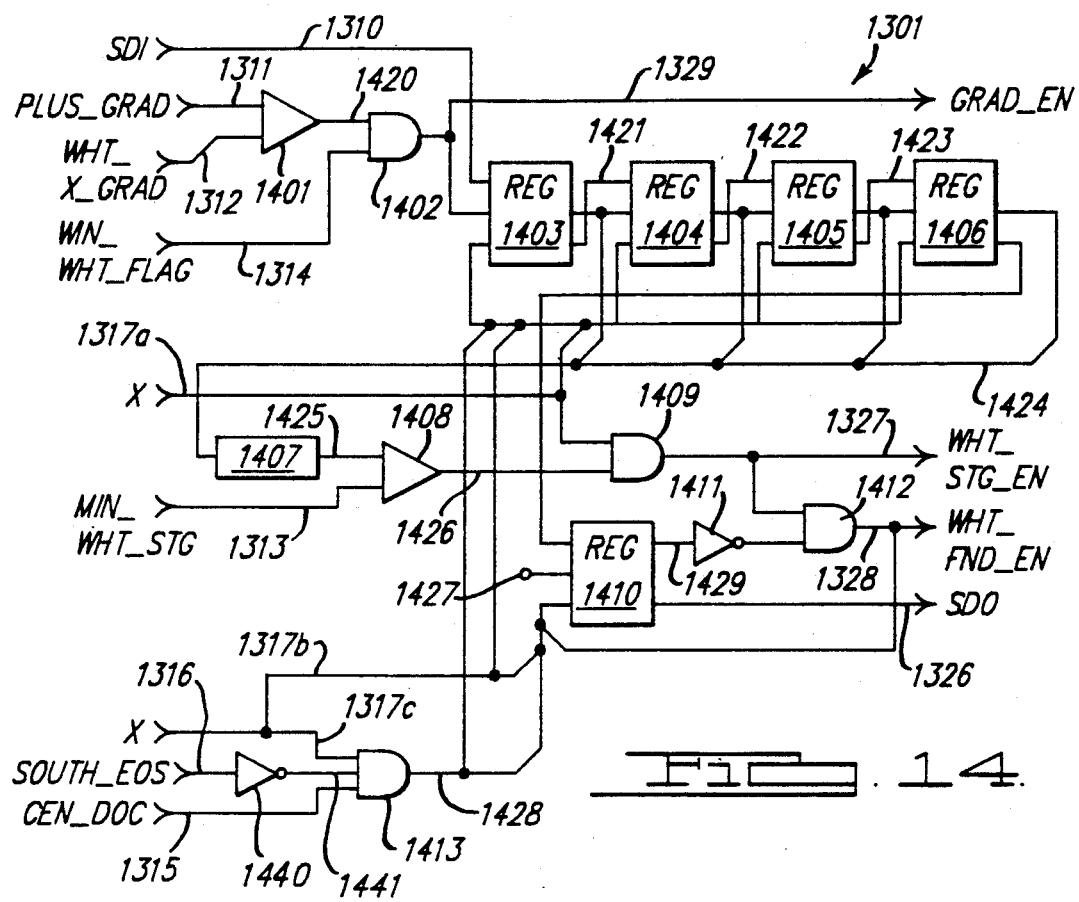
FIG. 14 is a functional schematic diagram of the white string processing element 1301 of FIG. 13 setting forth further details thereof.

FIG. 14 depicts further details of white string processing element 1301 of FIG. 13. Element 1301 accepts gradient information which has been previously calculated along with other parametric data indicating the location on the document of the pixel of interest and proceeds to develop output signals at buses 1327 and 1328 for use by element 1302 of FIG. 13. Element 1407 is a special purpose counter which tests for the presence of a predetermined number of adjacent white pixels stored in registers 1403-1406.

Figure 15:
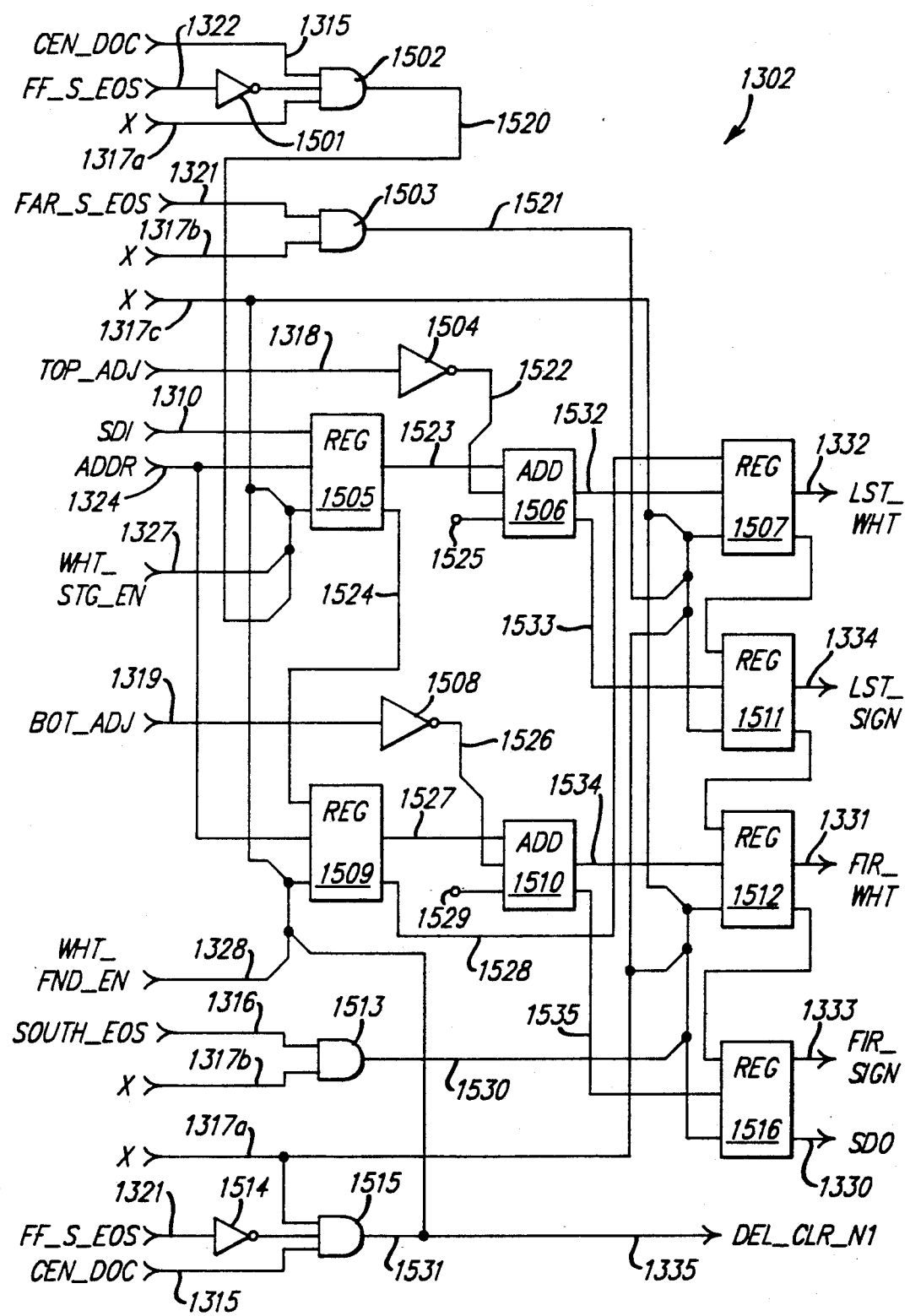
FIG. 15 is a functional schematic diagram of the white limits processing element 1302 of FIG. 13 setting forth further details thereof.

FIG. 15 depicts further details of the white limits processing element 1302 of FIG. 13. Element 1302 receives data regarding the position on the document of the pixel of interest on inputs 1315, 1322, 1321, 1318, and 1319, along with parametric data on other inputs shown and performs certain addition and subtraction processes to determine whether the pixel of interest is a last white pixel, a last signal pixel, a first white pixel, or a first signal pixel for use in further processing functions as defined by the pseudo code of Appendices 1 through 20.

Figure 16:
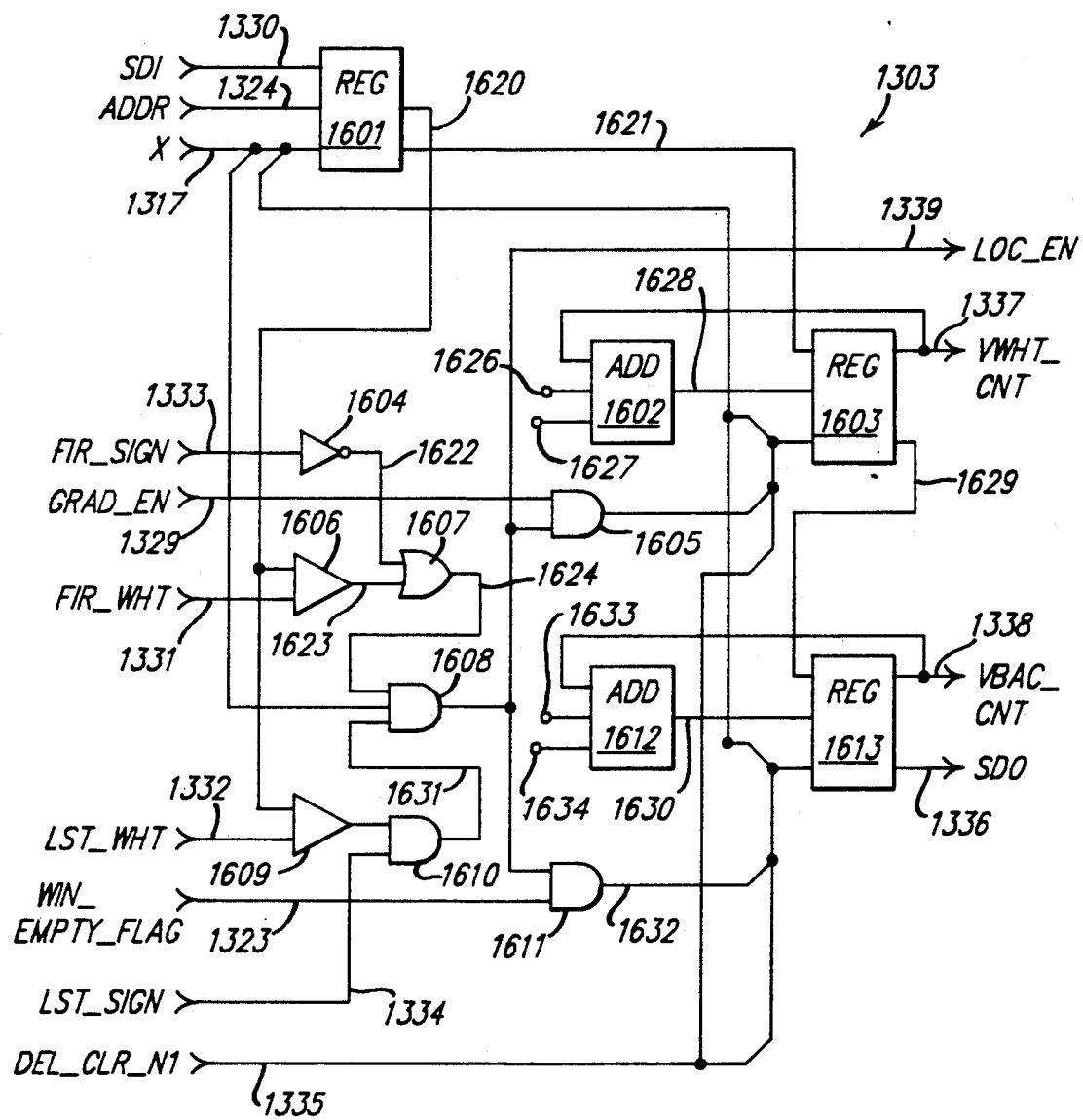
FIG. 16 is a functional schematic of the white location processing element 1303 of FIG. 13 setting forth further details thereof.

FIG. 16 sets forth further details of white locator processing element 1303 of FIG. 13. Element 1303 takes the first and last white or signal information on buses 1331 through 1334 along with other parametric inputs on buses 1323 and 1324, and calculates a vertical white count and a vertical background count for the current scan line being processed, in accordance with the pseudo code previously described. These calculations, as seen from the arrangement of the elements of FIG. 16, are performed using conventional adders, logic gates and registers.

Figure 17:
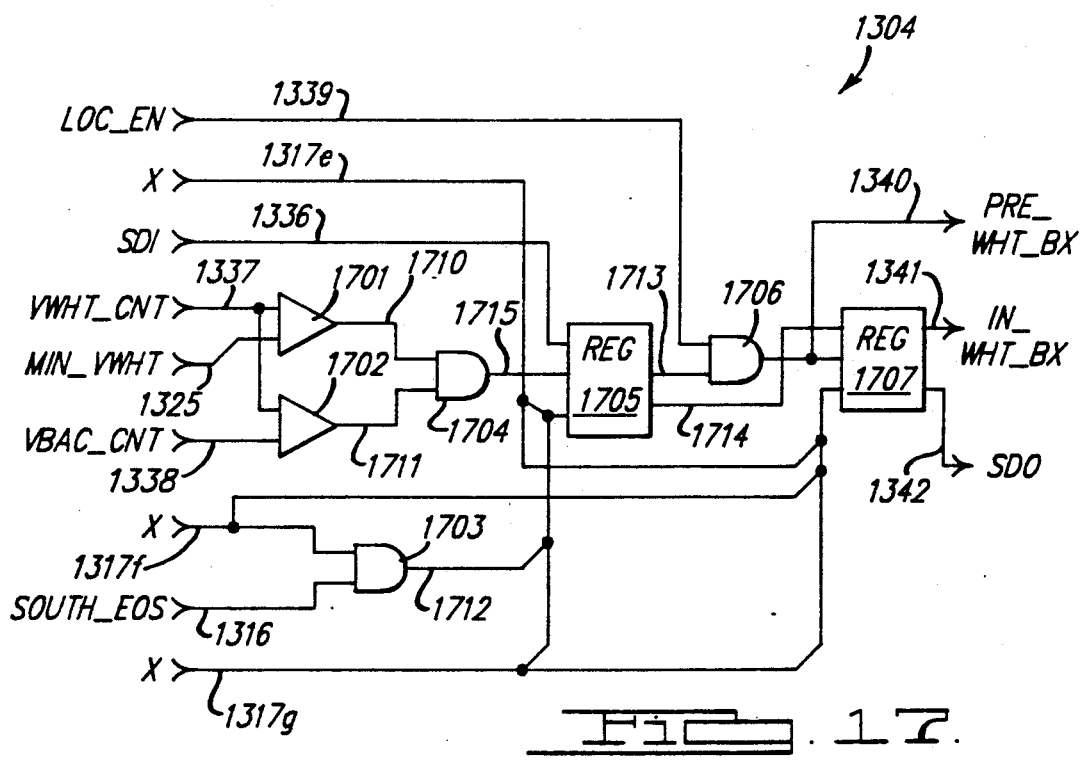
FIG. 17 is a functional schematic of the white size processing block 1304 of FIG. 13 setting forth further details thereof.

FIG. 17 sets forth further details of white size processing element 1304 of FIG. 13. Element 1304 accepts the vertical white count and the vertical background count on leads 1337 and 1338, and performs, using standard logic gates, the determination of whether or not the pixel of interest is in a so-called "white box" area of the document being processed. This indication is presented at bus 1341 as an output of the white box processing units of FIG. 13.

Figure 18:
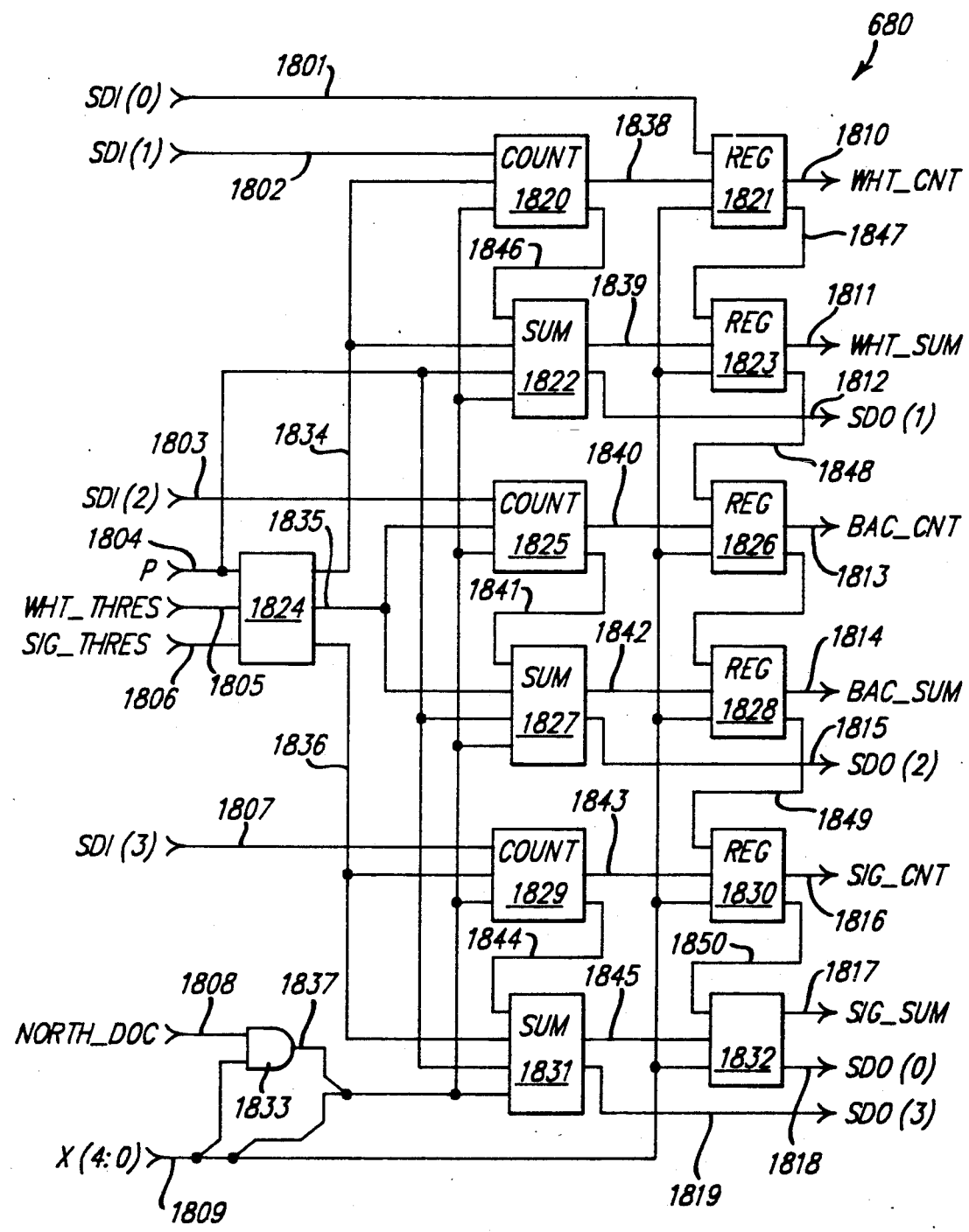
FIG. 18 is a functional diagram of the window status determining element 680 of FIG. 6 setting forth further details thereof.

FIG. 18 depicts further details of the window status determining element 680 of FIG. 6. Element 680 performs the functions of update window counts (Appendix 9) and compute conditional averages (Appendix 10). The counting registers and adders of FIG. 18 essentially take the pixel value at input 1804, along with the white threshold value at input 1805 and the signal threshold value at input 1806, and perform the calculations called for in the pseudo code set forth in Appendix 9. This results in the various white, signal, and background counts being updated and the conditional averages for background, signal and white values being calculated as set forth in pseudo code of Appendix 10. The conditional averages are calculated by concatenating the count and sum for white, signal or background, and utilizing the combined value as an address to a look-up table (not shown) which is read to produce the answer.

FIGS. 19-22 set forth further details of that portion of the hardware system of FIG. 6 which performs window classification and pixel thresholding functions — namely, determine window type (Appendix 11) and compute pixel threshold (Appendix 13).

Figure 19:
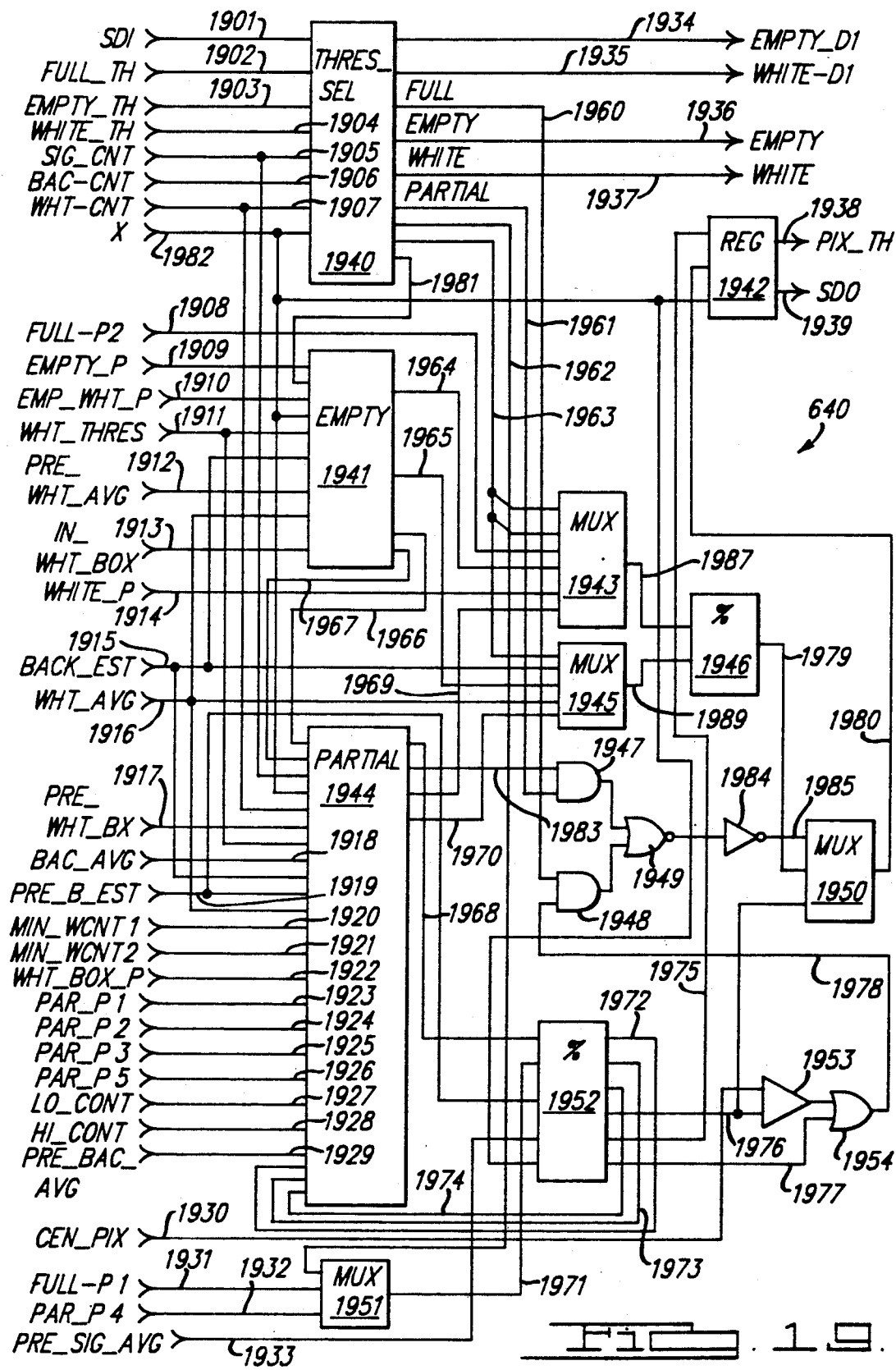
FIG. 19 is a functional block diagram of the pixel threshold determining element 640 of FIG. 6 setting forth further details thereof.

FIG. 19 sets forth a functional block diagram of pixel threshold element 640 of FIG. 6. The custom integrated circuitry set forth takes previously calculated values for the various averages and flags indicating whether or not textured background or white box type of special processing must be performed and determines whether the windows should be classified as all background (empty), mixed (partial), or all signal (full). Then, in accordance with this determination, the various tests and computations set forth in the pseudo code of Appendix 13 are performed resulting in a pixel threshold output at output 1938 of register 1942 of FIG. 19.

Figure 20:
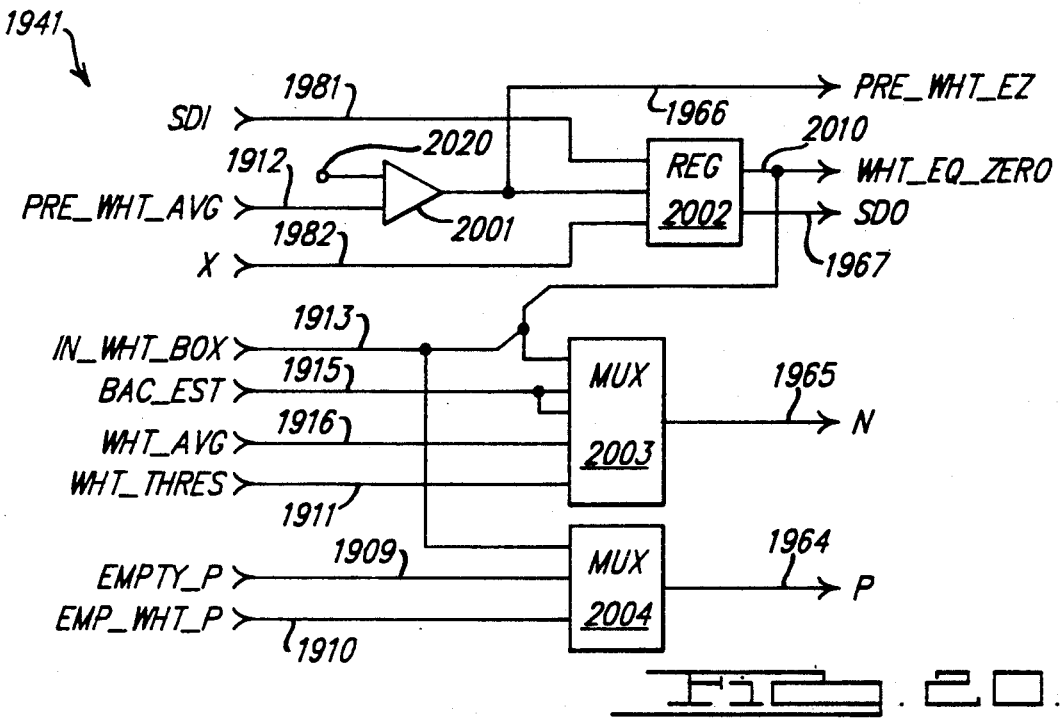
FIG. 20 is a functional block diagram of the element 1941 of FIG. 19 for determining a pixel threshold when a window has been classified as empty.
Figure 22:
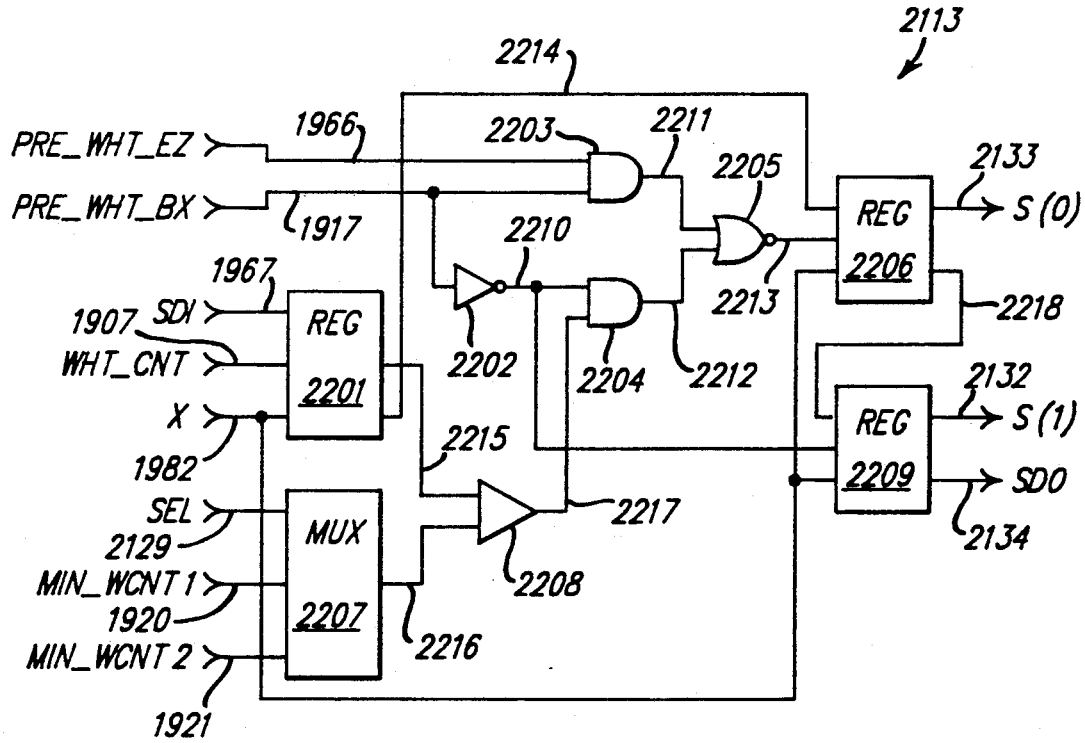
FIG. 22 is a functional block diagram of element 2113 of FIG. 21.

FIG. 20 depicts further details of element 1941 of FIG. 19 which performs pixel threshold calculations for an empty or mostly background pixel window. Likewise, FIG. 21 depicts further details of element 1944 of FIG. 19, which performs pixel threshold calculations for a partial or mixed pixel window, while FIG. 22 depicts further details of the preselect element 2113 of element 1944, set forth in FIG. 21. Element 2108 of FIG. 21 is a sequencer for enabling appropriate circuit elements via its outputs in accordance with prior decisions made by comparators 2103, 2104 and 2105. Outputs 1969(P) and 1970(N) of FIG. 21 are fed to special purpose percentage multiplier elements. P is the selected percentage multiplier, while N the multiplicand to be multiplied. As will be apparent to those skilled in the art, the apparatus arranged as set forth in FIGS. 19-22 performs the calculations set forth in Appendices 11 and 13. With reference to FIG. 19, threshold select element 1940 is comprised of a series of comparators for determining the window classification by examining the signal count, background count, and white count with relation to corresponding thresholds. Upon determination of the window type by element 1940, appropriate apparatus is enabled to perform the calculations for the respectively typed window, as set forth in the pseudo code of Appendix 13. Elements 1946 and 1952 are special purpose percentage multipliers.

Figure 23:
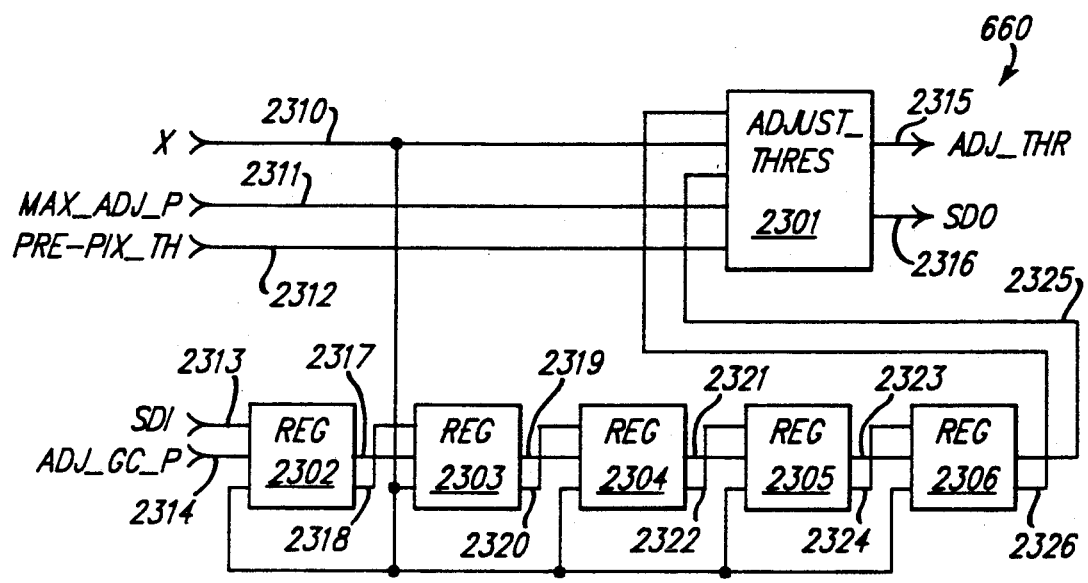
FIG. 23 is a functional block diagram of the pixel threshold adjustment element 660 of FIG. 6 setting forth further details thereof.
Figure 24:
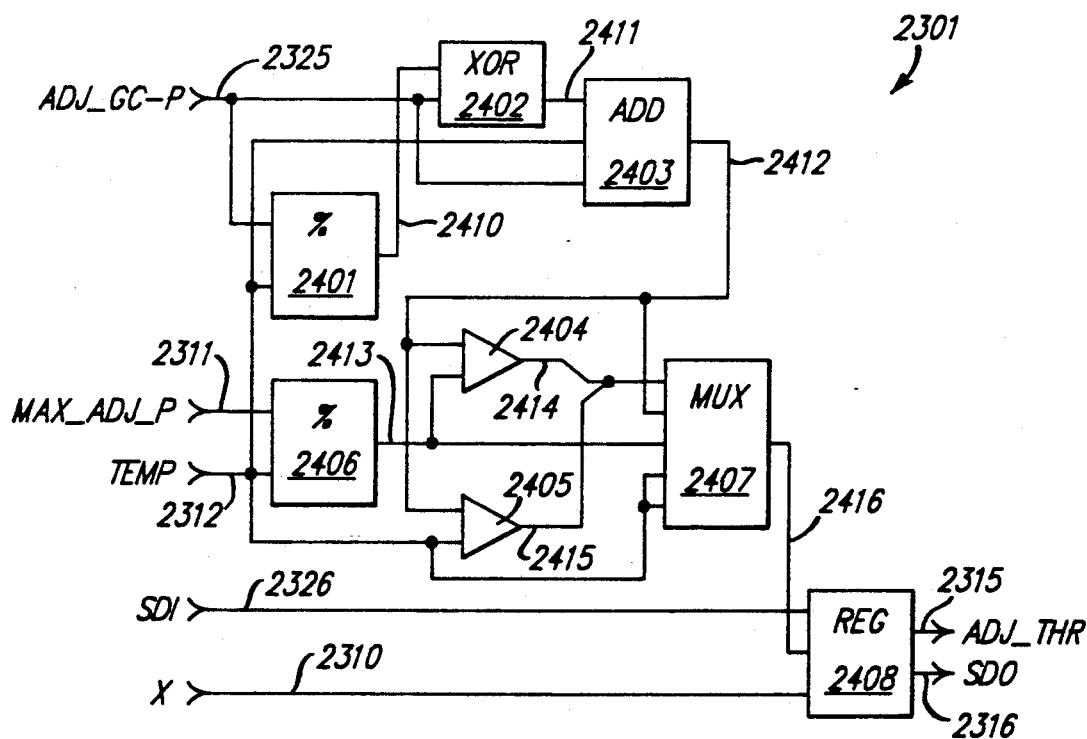
FIG. 24 is a functional schematic of the threshold adjustment element 2301 of FIG. 23.

FIGS. 23 and 24 set forth further details of that portion of the hardware system of FIG. 6 which performs the adjust pixel threshold function (Appendix 14). FIG. 23 depicts further details of element 660 of FIG. 6 which adjusts a previously computed pixel threshold under the appropriate circumstances set forth in the pseudo code of Appendix 14. FIG. 24 sets forth further details of the adjust threshold element 2301 of FIG. 23.

Figure 25:
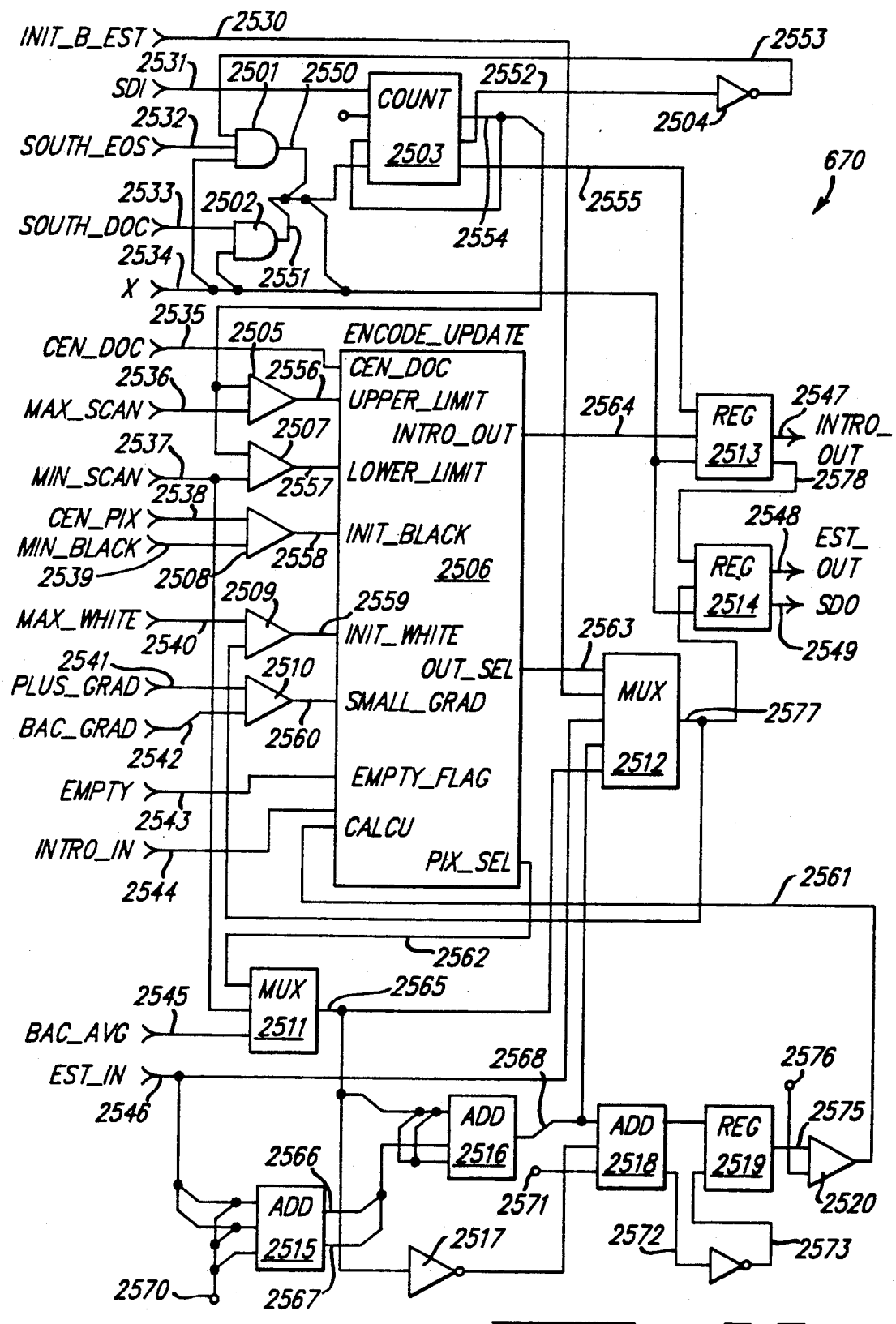
FIG. 25 is a functional schematic diagram of the background estimate update element 670 of FIG. 6 setting forth further details thereof.

FIG. 25 sets forth further details of that portion 670 of the hardware system of FIG. 6 which performs the function of updating the background estimate (Appendix 16). The background estimate currently in use is input to the apparatus of FIG. 25 at input 2546, and the new estimate is then output at output 2548. Encoder-/updater element 2506 is a custom integrated circuit for implementing the various IF statement tests called for in the pseudo code of Appendix 16.

CONCLUSION

A digital image preprocessing method as set forth above eliminates background patterns and scenes from digitized gray level document image data and features the following improvements over prior art suppression methods. Typically, pixel data displaying a contrast change lower than a specified print contrast signal parameter is suppressed to a white output level. The method is based on classifying and counting the gray level pixel data in a local pixel neighborhood surrounding the pixel to be thresholded and classifying that neighborhood to differentiate pixels which belong to written information from pixels which belong to the document background, even in areas of low contrast, textured background or white box areas of the document.

Those skilled in the art will recognize that alternative software or hardware approaches may be utilized to implement the method of the invention while retaining its essential characteristics. The invention is to be limited solely by the scope and spirit of the appended claims.

APPENDIX 1

INITIALIZE IMAGE VARIABLES

101.   INTRO_FLAG [i] = reset

102.   BACKGRD_EST [i] = INIT_BACKGRD_EST for i = 1 to n, where n = maximum number of pixels in a scan line.

103.   VAR_GRADIENT_CNT = 0

104.   TOTAL_GRADIENT_CNT = 0

105.   GRADIENT_CUTOFF = MIN_GRADIENT

106.   LOCAL_FIRST_WHITE_PEL = 0

107.   LOCAL_LAST_WHITE_PEL = 0

108.   VWHITE_CNT = 0

109.   VBACKGRD_CNT = 0

APPENDIX 2

RESET WHITE BOX LIMITS

201.   FIRST_WHITE_PEL = LOCAL_FIRST_WHITE_PAL - BOTTOM_ADJUST

202.    LAST_WHITE_PEL = LOCAL_LAST_WHITE_PEL - TOP_ADJUST

203.    LOCAL_FIRST_WHITE_FOUND = reset

APPENDIX 3

CHECK FOR SIZEABLE WHITE 301.    if((VWHITIE_CNT>MIN_VWHITE_CNT)AND(VWHITE_CNT>VBACKGRD_CNT))

302.            SIZEABLE_WHITE = set else

303.            SIZEABLE_WHITE = reset

APPENDIX 4

RESET WHITE BOX FINDER

401.    VWHITE [i] = 0              for i = 1 to 4

APPENDIX 5

COMPUTE SIGNAL THRESHOLD 501.    temp_signal_thresh = ((100 - PCS1)) x BACKGRD_EST [PEL 35])/100

502.    limit = (MIN_PERC_ADJUST x temp_signal_thresh)/100

503.    SIGNAL_THRESH = (temp_signal_thresh x (PERC_ADJUST - GRADIENT_CUTOFF))/100

504.    if   SIGNAL_THRESH < limit

505.            SIGNAL_THRESH = limit 506.    if   SIGNAL_THRESH > temp_signal_thresh 507.            SIGNAL_THRESH = temp_signal_thresh

APPENDIX 6

COMPUTE WHITE THRESHOLD

601.    WHITE_THRESH = ((100 + PCS2) x BACKGRD_EST [PEL 35])/100

602.    if    WHITE_THRESH > 63

603.        WHITE_THRESH = 63

APPENDIX 7

COMPUTE GRADIENTS 701.    half_pel = (pel 33)/2

702.    CROSS_GRADIENT = |pel 44 - pel 23| + |pel 34 - pel 32|

703.    northwest = |pel 44 - pel 22|

704.    southwest = |pel 42 - pel 24|

705.    GRADIENT = CROSS_GRADIENT + northwest + southwest 706.    if    (northwest > half_pel) OR (southwest > half_pel)

707.        GRADIENT = MIN_GRADIENT

APPENDIX 8

UPDATE GRADIENT COUNTERS 801.    if    (GRADIENT > GRADIENT_CUTOFF) AND (GRADIENT < MAX_GRADIENT)

802.        VAR_GRADIENT_CNT = VAR_GRADIENT_CNT + 1

803.    if    (GRADIENT > MIN_GRADIENT) AND (GRADIENT < MAX_GRADIENT)

804.        TOTAL_GRADIENT_CNT = TOTAL_GRADIENT_CNT + 1

APPENDIX 9

UPDATE WINDOW COUNTS for i = 1 to 4:

901.        WHITE_SUM [i] = WHITE_SUM [i + 1]

902.        BACKGRD_SUM [i] = BACKGRD_SUM [i + 1]

```
903.            SIGNAL_SUM [i] - SIGNAL_SUM [i + 1]
904.            WHITE_CNT [i] - WHITE_CNT [i +1]
905.            BACKGRD_CNT [i] - BACKGRD_CNT [i +1]
906.            SIGNAL_CNT [i] - SIGNAL_CNT [i + 1]
907.   WHITE_SUM [5] - 0
908.   SIGNAL_SUM [5] - 0
909.   SIGNAL_SUM [5] - 0
910.   WHITE_CNT [5] - 0
911.   BACKGRD_CNT [5] - 0
912.   SIGNAL_CNT [5] - 0 for pels 15, 25, 35, 45, 55:
913.       if    pel > - WHITE_THRESH
914.            WHITE_SUM [5] - WHITE_SUM [5] + pel
915.            WHITE_CNT [5] - WHITE_CNT [5] + 1
916.       else, if pel < - SIGNAL_THRESH
917.            SIGNAL_SUM [5] - SIGNAL_SUM [5] + pel
918.            SIGNAL_CNT [5] - SIGNAL_CNT [5] + 1
           else
919.            BACKGRD_SUM [5] - BACKGRD_SUM [5] + pel
920.            BACKGRD_CNT [5] - BACKGRD_CNT [5] + 1
```

APPENDIX 10

COMPUTE CONDITIONAL AVERAGES

```
       for i - 1 to 5:

1001.           SUM_WHITE_CNT      - sum (WHITE_CNT [i])
1002.           SUM_BACKGRD_CNT    - sum (BACKGRD_CNT [i])
1003.           SUM_SIGNAL_CNT     - sum (SIGNAL_CNT [i])
1004.           AVG_WHITE - sum (WHITE_SUM [i]) / SUM_WHITE_CNT
1005.           AVG_BACKGRD - sum (BACKGRD_SUM [i]) / SUM_BACKGRD_CNT
1006.           AVG_SIGNAL - sum (SIGNAL_SUM [i]) /SUM_SIGNAL_CNT
```

APPENDIX 11

DETERMINE WINDOW TYPE

| | | |
|---|---|---|
| 1101. | if | SUM_SIGNAL_CNT > = WINDOW_FULL_THRESH |
| 1102. | | WINDOW_TYPE = full |
| 1103. | if | SUM_BACKGRD_CNT > = WINDOW_EMPTY_THRESH |
| 1104. | | WINDOW_TYPE = empty |
| 1105. | if | SUM_WHITE_CNT > = WINDOW_WHITE_THRESH |
| 1106. | | WINDOW_TYPE = white |
| | else | |
| 1107. | | WINDOW_TYPE = partial |

APPENDIX 12

CHECK FOR WHITE BOX for i = 1 to 3:

1201.    VWHITE [i] = VWHITE [i +1]

1202.    if    (WINDOW_TYPE = white) AND (CROSS_GRADIENT < WHITE_CROSS_GRADIENT)

1203.        VWHITE [4] = set else

1204.        VWHITE [4] = reset for i = 1 to 4:

1205.        string_white = sum (VWHITE [i])

1206.    if    string_white > = MIN_WHITE_STRING

1207.        LOCAL_LAST_WHITE_PEL = location number of current pel 33

1208.            if LOCAL_FIRST_WHITE_FOUND = reset

1209.                LOCAL_FIRST_WHITE_FOUND = set

1210.                LOCAL_FIRST_WHITE_PEL = location number of current pel 33

1211.    if    (sizeable_WHITE = set) AND (location number of current pel 33 > =

FIRST_WHITE_PEL)

1212.        AND (location number of current pel 33 < =

1213.        LAST_WHITE_PEL)

1214.                      IN_WHITE_BOX = set else

1215.                     IN_WHITE_BOX = reset 1216.   if   (location number of current pel 33 > = FIRST_WHITE_PEL) AND 1217.       (location number of current pel 33 < = LAST_WHITE_PEL)

1218.         if   WINDOW_TYPE = empty

1219.               VBACKGRD_CNT = VBACKGRD_CNT + 1

1220.         if   (WINDOW_TYPE = white) AND (CROSS_GRADIENT < WHITE_CROSS_GRADIENT)

59

1221.                 VWHITE_CNT = VWHITE_CNT + 1

APPENDIX 13

COMPUTE PIXEL THRESHOLD 1301. if   WINDOW_TYPE = full 1302.       temp 1 = (FULL_PERC1 x (BACKGRD_EST [pel 33] - AVG_SIGNAL))/100

+ AVG_SIGNAL 1303.       temp 2 = (FULL_PERC2 x BACKGRD_EST [pel 33])/100

1304.       if pel   33 < temp 1

1305.           PIXEL_THRESH = temp 2 else

1306.           PIXEL_THRESH = temp 1

1307. if   WINDOW_TYPE = empty 1308.     if   IN_WHITE_BOX = set 1309.         if   AVG_WHITE = 0

1310.             PIXEL_THRESH =

(WIN_EMPTY_WHITE_BOX_PERC x WHITE_THRESH)/100 else

1311.             PIXEL_THRESH = (WIN_EMPTY_WHITE_BOX_PERC x AVG_WHITE)/100 else

1312.         PIXEL_THRESH = (EMPTY_PERC x BACKGRD_EST [pel 33])/100

1313. if WINDOW_TYPE = partial

```
1314.     if   SUM_SIGNAL_CNT = 0
1315.          if   IN_WHITE_BOX = set
1316.               if   AVG_WHITE = 0
1317.                    PIXEL_THRESH = (WHITE_BOX_PERC x WHITE_THRESH)/100
                    else
1318.                    PIXEL_THRESH = (WHITE_BOX_PERC x AVG_WHITE)/100
               else
```

APPENDIX 13 (Continued)

COMPUTE PIXEL THRESHOLD (Continued)

```
1319.               if   SUM_WHITE_CNT > MIN_WHITE_CNT
1320.                    PIXEL_THRESH = (PART_PERC1 x AVG_WHITE)/100
                    else
1321.                    PIXEL_THRESH = (PART_PERC2 x AVG_BACKGRD)/100
1322.     else if  ((BACKGRD_EST [pel 33] - AVG_SIGNAL)
                    x 100)/BACKGRD_EST [pel 33] < LOW_CONT_PCS
1323.          if   IN_WHITE_BOX = set
1324.               if   AVG_WHITE = 0
1325.                    PIXEL_THRESH = (WHITE_BOX_PERC x WHITE_THRESH) /100
                    else
1326.                    PIXEL_THRESH = (WHITE_BOX_PERC x AVG_WHITE)/100
               else
1327.               if   SUM_WHITE_CNT > MIN_WHITE_CNT2
1328.                    PIXEL_THRESH    =    (PART_PERC3 x AVG_WHITE)/100
                    else
1329.                    PIXEL_THRESH    =    (PART_PERC3 x AVG_BACKGRD)/100
1330.     else if  ((BACKGRD_EST [pel 33] - AVG_SIGNAL) x
                    100)/BACKGRD_EST [pel 33]>HIGH_CONT_PCS
1331.               PIXEL_THRESH = (PART_PERC4 x BACKGRD_EST [pel33]
                         - AVG_SIGNAL)/100 + AVG_SIGNAL
          else
1332.          if   AVG_BACKGRD = 0
```

1333.         PIXEL_THRESH = (PART_PERC5 x AVG_WHITE)/100

1334.         PIXEL_THRESH = (PART_PERC5 x AVG_BACKGRD)/100

1335.    if  WINDOW_TYPE = white

1336.         PIXEL_THRESH = (WHITE_PERC x AVG_WHITE)/100

APPENDIX 14

ADJUST PIXEL THRESHOLD 1401.    temp_pixel_thresh = PIXEL_THRESH 1402.    limit = (MIN_PERC_ADJUST x temp_pixel_thresh)/100

1403.    PIXEL_THRESH = temp_pixel_thresh x (PERC_ADJUST - GRADIENT_CUTOFF))/100

1404.    if      PIXEL_THRESH < limit

1405.             PIXEL_THRESH = limit 1406.    if      PIXEL_THRESH > temp_pixel_thresh 1407.             PIXEL_THRESH = temp_pixel_thresh

APPENDIX 15

THRESHOLD PIXEL 1501.         pel 33 = THRESHOLD_LUT [pel 33] [PIXEL_THRESH]

APPENDIX 16

UPDATE BACKGROUND ESTIMATE 1601.    if   (current scanline number < INIT_MAX_LINE_CNT)
              AND INTRO_FLAG [pel 33] = reset 1602.    if   (pel 33 > = INIT_MIN_BLACK) AND (CROSS_GRADIENT < BACKGRD_CROSS_GRADIENT)

1603.         BACKGRD_EST [pel 33] = (3 x (BACKGRD_EST [pel 33]) + pel 33)/4

1604.         if   |BACKGRD_EST [pel 33] - pel 33| < = 2

1605.              BACKGRD_EST [pel 33] = pel 33

| | | |
|---|---|---|
| 1606. | if | (current scan line number > = INIT_MIN_LINE_CNT) AND |
| | | (CROSS_GRADIENT < BACKGRD_CROSS_GRADIENT) AND |
| | | (BACKGRD_EST [pel 33] < INIT_MAX_WHITE) |
| 1607. | | INTRO_FLAG [pel 33] = set |
| 1608. | else if | WINDOW_TYPE = empty |
| 1609. | | BACKGRD_EST [pel 33] = (3 x (BACKGRD_EST [pel 33]) + AVG_BACKGRD)/4 |
| 1610. | if | \|BACKGRD_EST [pel 33] - AVG_BACKGRD\| < = 2 |
| 1611. | | BACKGRD_EST [pel 33] = AVG_BACKGRD |

APPENDIX 17

ADJUST GRADIENT CUTOFF

| | | |
|---|---|---|
| 1701. | half_gradient_cnt = TOTAL_GRADIENT_CNT/2 | |
| 1702. | if | VAR_GRADIENT_CNT > half_gradient_cnt |
| 1703. | | GRADIENT_CUTOFF = GRADIENT_CUTOFF + GRADIENT_DELTA |
| | else | |
| 1704. | | GRADIENT_CUTOFF = GRADIENT_CUTTOFF - GRADIENT_DELTA |
| 1705. | if | TOTAL_GRADIENT_CNT < MIN_GRADIENT_CNT |
| 1706. | | GRADIENT_CUTOFF = MIN_GRADIENT |
| 1707. | if | GRADIENT_CUTOFF < = MIN_GRADIENT |
| 1708. | | GRADIENT_CUTOFF = MIN_GRADIENT |
| 1709. | if | GRADIENT_CUTOFF > MAX_GRADIENT |
| 1710. | | GRADIENT_CUTOFF = MAX_GRADIENT |

APPENDIX 18

RESET GRADIENT COUNTERS

| | |
|---|---|
| 1801. | TOTAL_GRADIENT_CNT = 0 |
| 1802. | VAR_GRADIENT_CNT = 0 |

APPENDIX 19

RESET LOCAL WHITE BOX LIMITS

1901.   LOCAL_FIRST_WHITE_PEL = 0

1902.   LOCAL_LAST_WHITE_PEL = 0

APPENDIX 20

RESET WHITE BOX COUNTS

2001.   VWHITE_CNT = 0

2002.   VBACKGRD_CNT = 0

What is claimed is:

1. A method of suppressing background data from gray level document image data which has been captured from a document as a plurality of digitized picture element (pixel) gray level values ranging from a darkest gray level value to a whitest gray level value, the image pixels arranged in a plurality of contiguous scan lines extending from a bottom to a top edge of the document image, the method comprising the steps of:
   (a) selecting one of the plurality of pixels for examination;
   (b) defining a two-dimensional window of pixels centered about the selected pixel;
   (c) determining a gray level signal threshold and a gray level white threshold as functions of a gray level background estimate of at least a preselected pixel in the window;
   (d) determining counts of
      (1) all window pixels having gray levels in a range of gray levels extending between and including the white threshold and the whitest gray level and classifying such pixels as white pixels,
      (2) all window pixels having gray levels in a range of gray levels extending between and including the signal threshold and the darkest gray level and classifying such pixels as signal pixels, and
      (3) all window pixels having gray levels between the white threshold and the signal threshold and classifying such pixels as background pixels;
   (e) determining
      (1) a signal average gray level by summing gray levels of all signal pixels in the window and dividing by the count of the signal pixels,
      (2) a white average gray level by summing gray levels of all white pixels in the window and dividing by the count of white pixels, and
      (3) a background average gray level by summing gray levels of all background pixels in the window and dividing by the count of background pixels;
   (f) determining a window classification as one of all white, all signal, all background and mixed as a function of the counts determined in step (d);
   (g) determining a suppression threshold gray level for the selected pixel by
      (1) using a preselected function of the background average whenever the window classification is determined to be all background,
      (2) using a preselected function of the background estimate whenever the window classification is determined to be all signal,
      (3) using a preselected function of the window white average whenever the window classification is determined to be all white, or
      (4) using preselected functions of one of the white average, signal average, background average, white threshold and background estimate whenever the window classification is determined to be mixed;
   (h) determining a new gray level value for the selected pixel as a function of the selected pixel's current gray level value and the suppression threshold gray level value for the selected pixel; and
   (i) selecting another one of the plurality of pixels for examination and repeating steps (b) through (h) for every pixel in a document image.

2. The method of claim 1 further comprising the step of updating the background estimate of each pixel being examined prior to the step of selecting another one of the plurality of pixels for examination, the updating performed as a function of the background average gray level of the window.

3. The method of claim 2 further comprising determining, prior to step (g), whether a pixel being examined lies within a white box portion of the document image and wherein step (g) further comprises adjusting the suppression threshold gray level for the pixel being examined whenever it is determined that the pixel being examined lies within the white box portion.

4. The method of claim 3 further comprising determining, prior to step (g), whether a pixel being examined lies within an area of textured background in a document image and wherein step (g) further comprises adjusting the suppression threshold gray level for the pixel being examined whenever it is determined that the pixel being examined lies within the area of textured background.

5. The method of claim 4 wherein the step of determining whether a pixel being examined lies within an area of textured background is performed utilizing a gradient analysis of a portion of the window immediately surrounding the pixel being examined.

6. The method of claim 1 wherein the new gray level value for the selected pixel is determined by utilizing the contents of a lookup table at an address thereof determined by concatenating the suppression threshold with the selected pixel's current gray level value.

* * * * *